US011050700B2

(12) United States Patent
Roller et al.

(10) Patent No.: US 11,050,700 B2
(45) Date of Patent: Jun. 29, 2021

(54) ACTION RESPONSE SELECTION BASED ON COMMUNICATION MESSAGE ANALYSIS

(71) Applicant: salesforce.com, inc., San Francisco, CA (US)

(72) Inventors: William Christopher Fama Roller, San Francisco, CA (US); Shardul Vikram, San Jose, CA (US); Alex Michael Noe, Palo Alto, CA (US); Noah William Burbank, Palo Alto, CA (US); Sammy Adnan Nammari, Mountain View, CA (US); Ascander Dost, San Mateo, CA (US); Shuvajit Das, San Francisco, CA (US); Oliver Qian Tang, San Francisco, CA (US); Robert Christopher Ames, Sunnyvale, CA (US); Madhav Vaidyanathan, Sunnyvale, CA (US); Wing Hing Ku, San Jose, CA (US); Bhaskar Garg, San Francisco, CA (US); Xu Yang, San Francisco, CA (US); Madeleine Mary Gill, San Francisco, CA (US); Percy Dara Mehta, Foster City, CA (US); Janelle Wen Hui Teng, San Francisco, CA (US); Abraham Dio Suharli, Cupertino, CA (US); Alexis Roos, Palo Alto, CA (US); Wenhao Liu, Redwood City, CA (US); Nelson Esteban Acevedo, San Francisco, CA (US); Joseph Gerald Keller, San Francisco, CA (US); Rohit Deshpande, Fremont, CA (US); Sandeep Raju Prabhakar, Santa Clara, CA (US)

(73) Assignee: salesforce.com, inc., San Diego, CA (US)

( * ) Notice: Subject to any disclaimer, the term of this patent is extended or adjusted under 35 U.S.C. 154(b) by 236 days.

(21) Appl. No.: 15/803,720

(22) Filed: Nov. 3, 2017

(65) Prior Publication Data
US 2019/0140995 A1   May 9, 2019

(51) Int. Cl.
*H04L 12/58*   (2006.01)
*G06N 3/04*   (2006.01)
(Continued)

(52) U.S. Cl.
CPC ............ *H04L 51/18* (2013.01); *G06F 40/186* (2020.01); *G06F 40/216* (2020.01);
(Continued)

(58) Field of Classification Search
CPC ....... H04L 51/18; H04L 51/046; H04L 51/02; H04L 51/32; H04L 51/20; H04L 51/34;
(Continued)

(56) References Cited

U.S. PATENT DOCUMENTS

| 6,278,996 B1 * | 8/2001 | Richardson | .......... G06Q 10/107 |
| 7,644,057 B2 * | 1/2010 | Nelken | ............... G06F 17/2705 |
| | | | 706/55 |

(Continued)

OTHER PUBLICATIONS

Kannan, "Smart Reply Automated Response Suggestion for Email" arXiv:1606.04870v1, pp. 1-10 (Year: 2016).*

*Primary Examiner* — Mohamed A. Wasel
*Assistant Examiner* — Rachel J Hackenberg
(74) *Attorney, Agent, or Firm* — Holland & Hart LLP

(57) ABSTRACT

Methods, systems, and devices for analyzing communication messages (e.g., emails) and selecting corresponding actions are described. In some database systems, a user may receive multiple messages at a user device. To efficiently determine responses to these messages, the user device may send the messages to a backend server for analysis. The
(Continued)

server may perform natural language processing (NLP) to classify the message with one or more binary classifications and may extract metadata from each message. Based on the classifications and the metadata, the server may determine one or more actions the user device may perform to respond to each message. The server may send instructions to the user device indicating the suggested actions, and the user device may display these actions as options to a user. Additionally, the user device may use the classifications and metadata to automatically generate one or more communication templates in response to the message.

19 Claims, 12 Drawing Sheets

(51) Int. Cl.
 *G06N 3/08* (2006.01)
 *G06Q 10/10* (2012.01)
 *G06F 40/30* (2020.01)
 *G06F 40/40* (2020.01)
 *G06F 40/56* (2020.01)
 *G06F 40/186* (2020.01)
 *G06F 40/216* (2020.01)
 *G06F 40/295* (2020.01)

(52) U.S. Cl.
 CPC ............ *G06F 40/295* (2020.01); *G06F 40/30* (2020.01); *G06F 40/40* (2020.01); *G06F 40/56* (2020.01); *G06N 3/0445* (2013.01); *G06N 3/08* (2013.01); *G06Q 10/10* (2013.01)

(58) Field of Classification Search
 CPC ....... H04L 65/40; G06F 17/28; G06F 40/186; G06F 40/106; G06F 40/10; G06F 40/56; G06F 40/40; G06F 3/0482; G06F 3/04842; G06F 16/285; G06F 16/93; G06F 40/295; G06F 40/216; G06F 40/30; G06N 3/0445; G06N 3/08; G06N 20/00; G06N 3/0454; G10L 15/22; G10L 15/1822; G10L 15/18; G10L 15/063; G10L 15/16; G06Q 10/10
 See application file for complete search history.

(56) References Cited

U.S. PATENT DOCUMENTS

| | | | |
|---|---|---|---|
| 10,547,574 B2* | 1/2020 | Pham | G06F 40/56 |
| 2015/0039292 A1* | 2/2015 | Suleman | G06F 17/289 704/9 |
| 2018/0012232 A1* | 1/2018 | Sehrawat | G06Q 30/016 |
| 2018/0165612 A1* | 6/2018 | Saxena | G06Q 10/0631 |
| 2018/0239770 A1* | 8/2018 | Ghotbi | G06F 9/453 |
| 2018/0367483 A1* | 12/2018 | Rodriguez | H04L 51/046 |
| 2020/0143114 A1* | 5/2020 | Dua | G06N 20/00 |

* cited by examiner

ACTION RESPONSE SELECTION BASED ON COMMUNICATION MESSAGE ANALYSIS

FIELD OF TECHNOLOGY

The present disclosure relates generally to database systems and data processing, and more specifically to action response selection based on communication message analysis.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The users of a cloud platform may receive large quantities (e.g., hundreds) of communications each day. These communications may span many communication platforms (e.g., email, social media, voice calls, in-application messaging, etc.), and a user may desire to respond in different ways to many of these communication messages. However, reading or listening to each of these messages in order to draft a response—even a stock response with very few modifications—may be very inefficient and result in delayed responses to the communication messages. A user may desire an effective way to manage and respond to this large quantity of messages in a time-sensitive yet configurable manner.

DETAILED DESCRIPTION

Figure 1:
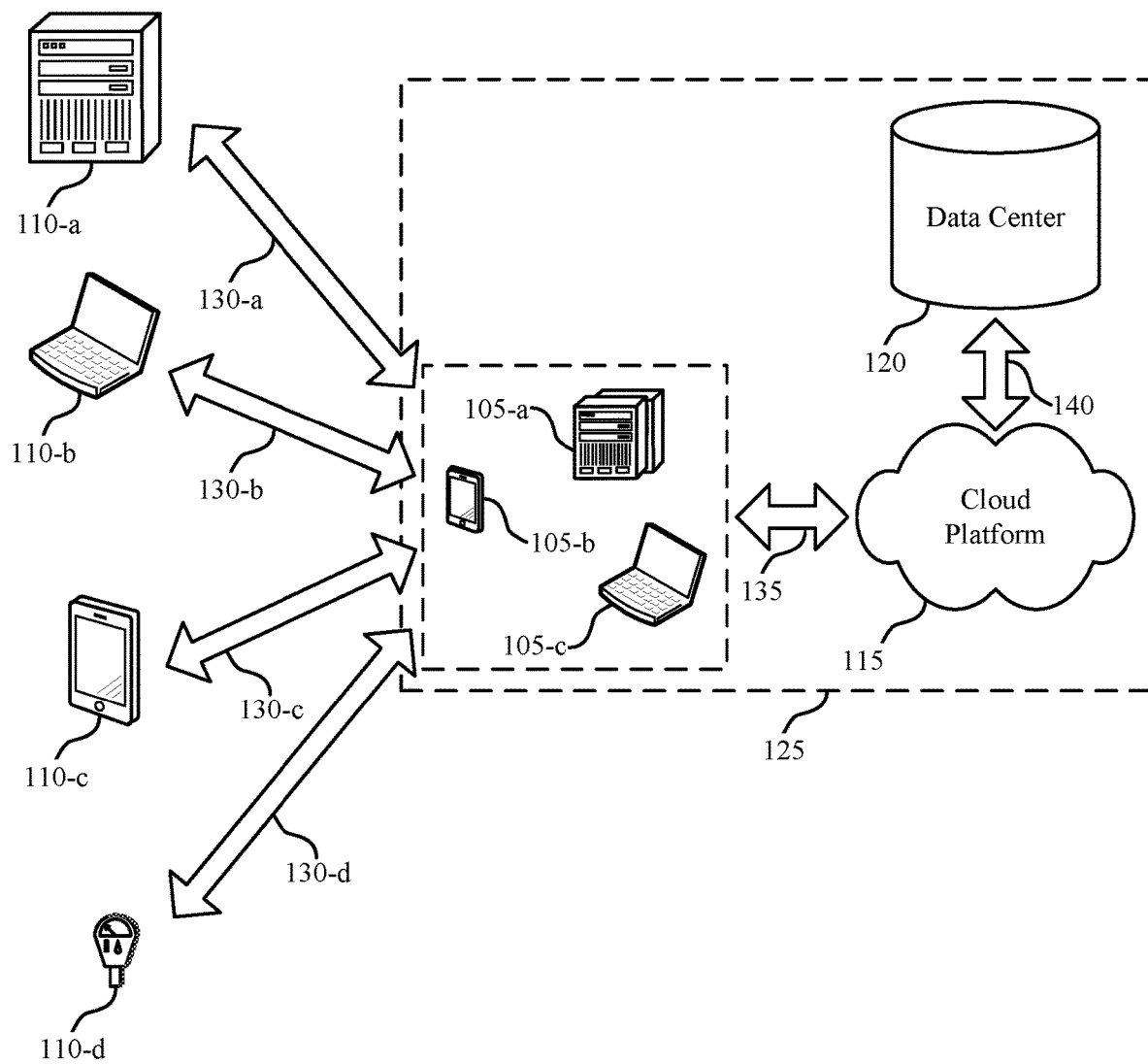
FIG. 1 illustrates an example of a system for communication data processing at a database server that supports action response selection based on communication message analysis in accordance with aspects of the present disclosure.

In some database systems, users may receive multiple communication messages (e.g., emails, calendar events, text messages, etc.) at one or more user devices. To effectively determine responses to these messages, a database server of the database system may support action response selection based on communication message analysis. For example, the database server may host a streaming data pipeline or streaming data processing platform for processing communication messages. The database server (e.g., via the streaming data pipeline) may implement natural language processing (NLP) and machine-learning techniques to construct one or more models for analyzing communication messages. The models may be based on previously received communications cached in memory (e.g., at a user device or a data center), pseudo-realtime streams of communications at a user device, user feedback, or some combination of these factors. In some cases, the models may be configurable and user-specific.

When a new communication message is sent to a user device, the new communication message may additionally be received by the database server for processing (e.g., using the streaming data pipeline). The server may perform NLP (e.g., according to a model) on the message in order to determine insights and extract metadata from the message. The insights may correspond to one or more binary classifications, and the server may use these insights—and, in some cases, the extracted metadata entities—to classify the message. The server may store a list of possible actions to perform in response to a message. Based on the binary classifications of the message, the server may select one or more actions to suggest to the user device from the list of possible actions. In some cases, the database server may determine one or more services corresponding to the actions to indicate to the user device.

If the user device accesses the communication message, the user device may connect to the database server and may request any suggested actions derived from the communication message. The server may send instructions to the user device indicating these services or actions. Based on the instructions, the user device may automatically generate a communication template (e.g., incorporating the extracted metadata entities and/or the binary classifications), and may display the suggested actions in a user interface. If a user selects one of the actions, the user device may perform the selected action. In some cases, this may include sending one of the generated communication templates in response to the message. The user device may additionally send feedback to the server indicating the selected action, and the server may modify the analysis model based on the feedback. In some cases, the user device may automatically perform an action (e.g., automatically generate a communication template and send it) if that action is selected by a user a percentage of the time above a certain accuracy threshold (e.g., an automated workflow if confidence in the model is sufficiently high). Additionally or alternatively, the database server may handle user-specific analysis configurations and cross-device action tracking. For example, if a user selects to perform an action on a first device, the database server may detect this and may not suggest the same action on another device for the user.

Aspects of the disclosure are initially described in the context of systems supporting on-demand database services. Additional aspects of the disclosure are described with respect to communication message processing, action suggestion processing, and NLP, as well as a method process flow. Aspects of the disclosure are further illustrated by and described with reference to apparatus diagrams, system diagrams, and flowcharts that relate to action response selection based on communication message analysis.

FIG. 1 illustrates an example of a system 100 for cloud computing that supports action response selection based on communication message analysis in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, subsystem 125 may support automatic action response selection for responding to communication messages. For example, a server—which may be a component of the cloud platform 115 or the data center 120—may support NLP and action selection for a cloud client 105 using a streaming data pipeline or streaming data processing platform. For example, the server may initially build an NLP model for determining insights and extracting metadata from communication messages (e.g., emails). The server may use these insights to classify the messages according to one or more binary classifications, and may select actions to suggest to the cloud client 105 based on these classifications.

Once the model is built, the server may analyze new communication messages in pseudo-realtime. For example, a contact 110 may send an email to the cloud client 105. This email may be received by the backend server based on a connection between the cloud client 105 and the server, or the cloud client 105 may forward the email to the backend server. The server may perform NLP on the email using the constructed model. The server may perform binary classification of the email based on detected insights within the email, and may extract metadata entities from the email. The server may then use these insights and entities to select one or more services corresponding to actions to perform in response to this email, and may send instructions to the cloud client 105 indicating these services. Based on the instructions, the cloud client 105 may automatically generate a communication template (e.g., incorporating the extracted metadata entities and/or the binary classifications) and may display the suggested actions to a user. If the user selects one of the actions, the cloud client 105 may send feedback to the server of the selected action. Additionally or alternatively, if the selected action involves responding to the contact 110, the cloud client 105 may send a generated communication template to the contact 110 to efficiently respond to the analyzed email.

Figure 2:
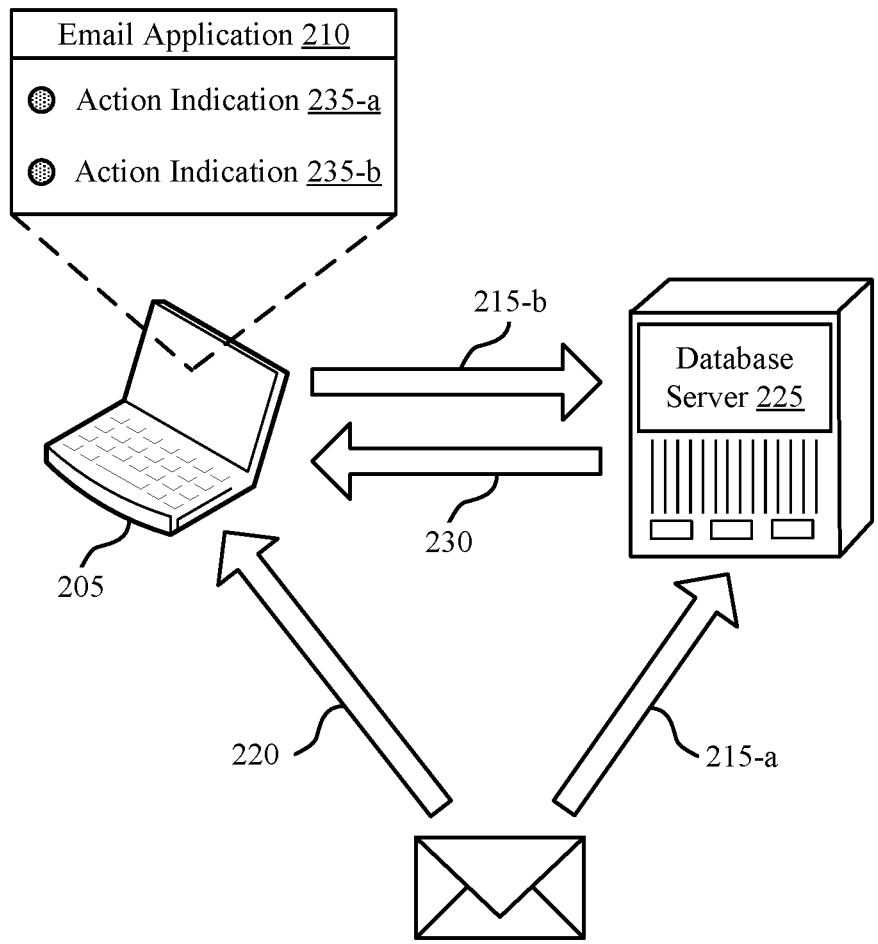
FIG. 2 illustrates an example of a system that supports action response selection based on communication message analysis in accordance with various aspects of the present disclosure.

FIG. 2 illustrates an example of a system 200 that supports action response selection based on communication message analysis in accordance with various aspects of the present disclosure. The system 200 may include a user device 205 and a database server 225. The user device 205 and the database server 225 may be components of the subsystem 125, as described with reference to FIG. 1. For example, the user device 205 may be an example of a cloud client 105, while the database server 225 may be a component of the cloud platform 115 or data center 120. As illustrated, the database server 225 may analyze an email that is associated with an email application 210 at the user device 205. However, the database server 225 may additionally or alternatively analyze any other type of communication message, including calendar events, service tickets, text messages, voice calls, social media messages, or any other type of communication. It is to be understood that, as described below, the functionality attributed to the database server 210 may be performed using a streaming data pipeline or streaming data processing platform.

The database server 225 may receive an incoming communication message (e.g., an email) over a communication link 215. For example, the database server 225 may receive an incoming communication message over communication link 215-a (e.g., as the user device 205 receives the same email simultaneously over communication link 220). In some examples, this email may be an email related to a CRM or sales process. The email may include natural language text discussing these CRM or sales processes. The database server 225 may then analyze the communication as described below. When the user device 205 accesses the communication (e.g., via email application 210), the user device 205 may establish a connection with database server 225 (e.g., via communication link 215-b) and may retrieve any of the clarifications or extracted data associated with the message that resulted from the analysis (e.g., via communication link 230). However, in some examples, the communication message may be received directly at the user device 205 (e.g., over communication link 220). In such examples, the user device 205 may forward a copy of this email to the database server 225 over communication link 215-b, after which the database server 225 may perform the analysis on the communication message.

The database server 225 may implement an NLP classifier to identify key insights or moments included in the email, and may pair these insights with actionable suggestions for a user. These insights or moments may be examples of triggers based on natural language classifiers that categorize the email (e.g., into one or more binary classifications). For example, the database server 225 may detect a pricing mention, a scheduling intent, a competitor mention, an executive added, an out of office or vacation automatic response, or any other binary classifier. The binary classifier may indicate in a binary fashion whether or not one of these insights or moments was detected in the communication. A communication may be classified as including one or multiple binary classifications (e.g., a scheduling intent and a pricing mention).

The database server 225 may additionally or alternatively extract certain entities from the text of the email. While these entities may not influence the binary classifications, the entities (e.g., metadata) may provide other information or context about the email. For example, the extracted metadata may include dates, names, amounts, or other parameters or values included in the communication message. In some examples, the extracted metadata may enhance the actions or the associated communication template by providing additional information, or by facilitating a more tailored communication template (e.g., with more fields that are filled in).

Using the email classifications, the extracted entities, or both, the database server 225 may determine one or more actions to take in response to the email. These may be actions for the user device 205 to perform, or actions for the database server 225 to perform, or a combination. The list of possible actions may be configurable by a user. For example, a user may select one or more actions as options when receiving certain types of email messages. In one example, if the user device 205 receives an email requesting a meeting, a corresponding action may be to send an indication of one or more available time slots in response. As described in more detail below, as part of an action, the user device 205, the database server 225, or some associated application or entity may automatically generate a communication template that incorporates information from or is otherwise based on the binary classifications, the extracted metadata, or both. The database server 225 may select one or more services (e.g., code-based functionality processed at the server) corresponding to the actions. These services may allow for the database server 225 to transmit instructions to the user device 205 over communication link 230. In some cases, the database server 225 may transmit the instructions based on the user device 205 accessing the communication message.

The user device 205 may receive the instructions, and may process the instructions using a web or native application, such as an email application 210. The user device 205 may process the instructions using the same application that received the initial communication message over communication link 220. The instructions may indicate to the user device 205 which actions to suggest and which templates to generate. For example, if the database server 225 determines two actions to suggest in response to the email, the user device 205 may display indications of these two actions, action indication 235-a and action indication 235-b, in a user interface for the email application 210. In addition to displaying these action indications 235, the user device 205 may generate communication templates based on the instructions. For example, either the database server 225 or the user device 205 may store one or more templates, which may be examples of emails, calendar invites, notifications, documents, etc. According to the instructions, the user device 205 may automatically populate one or more fields of a template using information related to the extracted metadata or a binary classification. This generated communication template may be prepared for sending, by the user device 205, to another user device, or may be displayed at the user device 205. For example, an automatically generated notification may be displayed in a user interface of the email application 210 or the user device 205, while an automatically generated email may be prepared for sending. If a user of the user device 205 selects the action indication 235 corresponding to sending the email, the email application 210 may send the generated communication template email (e.g., in response to the sender of the initially received email).

Figure 3:
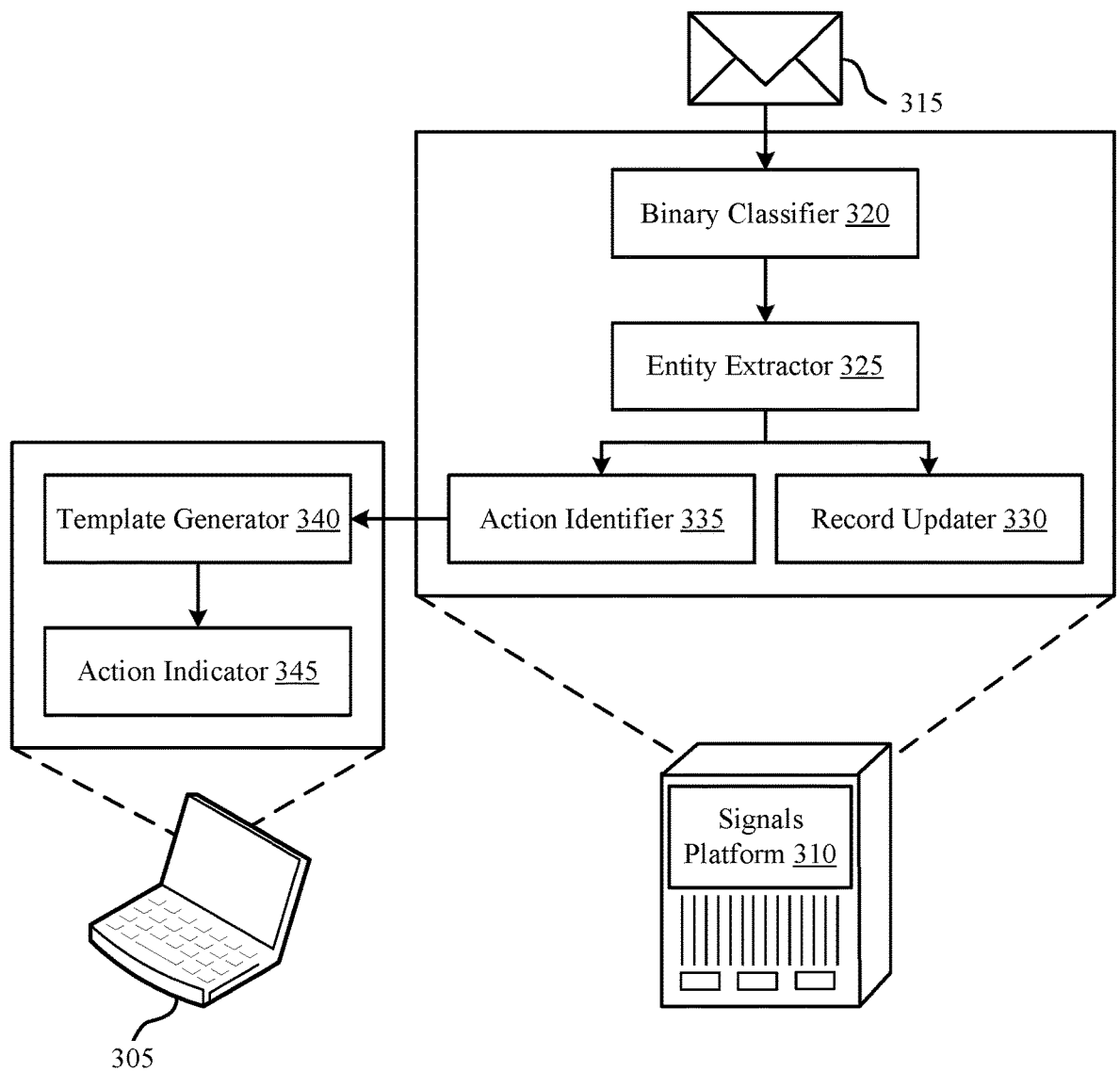
FIG. 3 illustrates an example of communication message processing that supports action response selection based on communication message analysis in accordance with various aspects of the present disclosure.

FIG. 3 illustrates an example of communication message processing 300 that supports action response selection based on communication message analysis in accordance with various aspects of the present disclosure. The communication message processing 300 may involve a user device 305 and a database server, which may be examples of the corresponding devices described with respect to FIG. 3. The database server may support functionality for classifying communication messages 315 (e.g., emails, text messages, calendar event invites, etc.) and determining actions based on the classifications. In some cases, this functionality running on the database server may be referred to as the Signals Platform 310. The database server (e.g., the Signals Platform 310 running on the database server) may send indications of the determined actions to the user device 305, and the user device 305 may display these indications for user selection.

The Signals Platform 310 may be an example of an activity-moment generation system. This activity-moment generation system may accelerate the ability of a user to respond to communications (e.g., from a customer). The activity-moment generation system combines text classification and action-based workflows to perform rapid prioritization and response to certain communication messages 315. The following processes and components are described as possible steps in the activity-moment generation system, but the framework is extensible and may include additional or alternative combinations of text-classifiers and actions.

The activity-moment generation system may run on a backend system (e.g., the database server or a streaming data processing platform hosting the Signals Platform 310), and may operate at runtime or on cached communication messages 315. For example, the database server may receive one or more communication messages 315 (e.g., emails) as input. In a first example, the communication messages 315 may be received at the database server from a transmitting user device or a receiving user device, such as the user device 305 (e.g., processing a stream of emails as the emails are transmitted and received). The database server may associate each incoming communication message 315 with a certain tenant, user, or account, as opposed to associating the messages with the user device 305. For example, for an email, the database server may associate the email with any number of recipients (e.g., a user who received the given email, either in the "to," "cc," or "bcc" field), and the database server may trigger one or more moment-action combinations for any of these recipients. In this way, the Signals Platform 310 may track activity for a user across multiple different user devices 305 and, accordingly, the database server may select actions based on user activity and received messages regardless of user device 305.

In a second example, a set of communication messages 315 may be retrieved from record storage at a database and processed by the Signals Platform 310. For example, in a retroactive system, the database server may process a previous set of communication messages 315, performed actions, or both corresponding to a certain time period or number (e.g., emails received over the previous year, the previous one hundred emails, or any other time period or number based on a configuration of the Signals Platform 310). The database server may scrub these previous communication messages 315 to improve classifying and extraction operations (e.g., using a machine-learned model). In some cases, the Signals Platform 310 may implement a retro-reactive procedure, with a user message blacklist operation. The database server may perform blacklist operations on one or more communication messages 315 to ensure individual or organizational privacy, and may perform the blacklist operations in reverse chronological order over a set of communication messages 315. A blacklist operation may additionally ensure or improve the quality of downstream analysis or reporting of communication messages 315 using the internal domain blacklist. Analyzing the previous sets of communication messages 315 may improve performance of the realtime or pseudo-realtime processing of communication message 315 streams at a user device 305.

For the realtime or pseudo-realtime operations, when receiving a communication message 315 (e.g., from either a transmitting device or the receiving user device 305), the database may send the communication message 315 to a binary classifier 320. The binary classifier 320 may identify key moments or insights within a communication message 315. When receiving a communication message 315, the binary classifier 320 may perform NLP on text corresponding to the communication message 315, may perform metadata extraction on the communication message 315, or may perform any other processes on the message in order to sort the message into one or more classifications. In some cases, the text processed by the binary classifier 320 may only be a portion of the full communication message 315 (e.g., in the case of an email, the binary classifier 320 may perform NLP on the body of the email, the subject line of the email, the entire email, etc.).

The binary classifications may be referred to as insights or moments. Some examples of these binary classifications include a scheduling intent, a pricing request, an out of office or vacation autoresponder detection, a competitor mention, or the addition of an executive. A scheduling intent may be a binary classifier that indicates if the sender (e.g., a user who composes the communication message 315 and sends it to another party, referred to as the recipient) of the communication message 315 is trying to establish a meeting time. A pricing request may be a binary text classifier that indicates if the sender is discussing pricing. An out of office or vacation autoresponder detection may be a binary text classifier that indicates if the communication message 315 is sent as an automated message from a user who has selected to send out of office or vacation auto-responses. A competitor mention may be a binary classification that involves the binary classifier 320 performing text-based entity extraction to detect if a sender has mentioned a competitor (e.g., a person, business, or organization that is in competition with the sender, the recipient, or an associated organization) within the text of the communication message 315. An executive addition may be a binary classification that involves the binary classifier 320 performing metadata detection to determine whether an executive (e.g., a user previously identified or designated as an executive) is added to the communication message 315. To determine an executive addition binary classification, the binary classifier 320 may include a title normalizer to convert from a specific user title to a generic "executive" moniker. In addition to or instead of the above classifications, the binary classifier 320 may identify any number of other binary classifications based on the text of the communication message 315.

The communication message 315 may additionally or alternatively be processed by an entity extractor 325. The entity extractor 325 may perform NLP to identify metadata entities included in the communication message 315. In some cases, the Signals Platform 310 may perform a single NLP procedure, which may include both binary classification and entity extraction. For example, for an email, the entity extractor 325 may determine entities included within the email body, included in the lists of recipients (e.g., in the "to" or "cc" fields), or in any other portion of the email. Some examples of the entities that the entity extractor 325 may detect include dates, date times, persons (e.g., names or titles), email addresses, phone numbers, organizations, locations, currency amounts, numbers, or any other values or parameters within a communication message 315. While the database server may not use these values to classify the communication message 315, these values may instead be used to populate communication templates or select possible actions for the user device 305.

In some systems, the Signals Platform 310 may use information obtained by either the binary classifier 320 or the entity extractor 325 to update information stored in a database or an application. For example, the record updater 330 may automatically update stored data records in a database, a web application, or a native application. In some cases, this record updating may not involve sending any information to the user device 305. In other cases, the record updater 330 may send an indication of the updated data records to the user device 305.

Action identifier 335 may provide specific linking of actions to binary classifications or extracted entities. Actions are examples of processes or functionality that a user may perform upon detection of certain insights or moments within a communication message 315. These actions may involve standard email or calendaring capabilities (e.g., reply, forward, etc.), or may involve more tailored productivity features additive to the standard email or calendaring functionality. The actions may include performing standard actions at the user device 305, or may include custom actions at the user device 305. In some cases, the actions may be selected based on the binary classifications, and the actions may be augmented based on the extracted metadata entities.

The action identifier 335 may select actions based on patterns by a user. For example, the action identifier 335 may identify actions that are commonly (e.g., above a certain threshold percent) performed at a user device 305 by the user when receiving a certain type of communication message 315. Some examples of actions that the action identifier 335 may select include sending availability, sending a calendar invite, replying to an message (e.g., using a template), creating a task based on information within the communication message 315, or any other action commonly performed by the user in response to a communication message 315. The database server may send indications of one or more of these actions to the user device 305 to suggest to a user in order to improve the response speed and increase the efficiency of the user.

For example, if the communication message 315 is classified as including a scheduling intent, the action identifier 335 may identify sending an availability, creating a calendar invite, or viewing a calendar as actions. These actions may utilize any date or datetime metadata determined by the entity extractor 325. A communication message 315 with a pricing request may correspond to a message reply action. In some cases, this message response may be based on a communication template indicating one or more prices, which may be modified based on any products mentioned or locations identified within the communication message 315. The action identifier 335 may select a reply action (e.g., either an immediate reply or a delayed reply set for a scheduled delivery date some time in the future) or a create task action in response to a communication message 315 with a detected out of office or vacation auto-response. For example, the entity extractor 325 may determine a date associated with the end of the out of office or vacation window, and may set the reply message to be sent on that date or assign a due date for the application task to that date. If the action identifier 335 receives a communication message 315 with a competitor mention, the action identifier 335 may select an action to reply with a message. Similarly, a communication message 315 with an executive added may correspond to an action to reply with a message or an action to view contact details for the executive. These selected actions are all possible responses to the above described binary classifications, but the action identifier may additionally or alternatively select any other pre-defined actions based on a database server configuration or on historical action patterns for a user.

The action identifier 335 may send the determined actions as suggested actions to the user device 305. For example, the user device 305 may access the communication message, and the Signals Platform 310 may send the suggested actions to be displayed with the communication message. The user device may include a template generator 340. In some cases, the database server may additionally send one or more communication templates to the user device 305. In other cases, the user device 305 may store the one or more communication templates in memory (e.g., for a certain application). The template generator 340 may automatically generate one or more templates based on instructions received from the action identifier 335. For example, if the action identifier 335 suggests a reply action, the template generator 340 may use an email template, the binary classifications, the extracted metadata, or some combination of these to generate an email to send in response to the communication message 315. In one specific example, the Signals Platform 310 may receive a communication message 315 including a scheduling intent. The action identifier 335 may select an action to send a calendar invite. The template generator 340 at the user device 305 may create a calendar invite based on the indicated actions and metadata (e.g., suggested dates or times in the text of the communication message 315) determined by the Signals Platform 310, and may send this calendar invite in response to the communication message 315 if selected by the user.

For the user to select one or more actions to perform, the user device 305 include an action indicator 345, which may display the suggested actions in a user interface of the user device 305. A user may select one or more of the displayed actions, and the user device 305 may perform the selected action (e.g., using the generated communication templates). In some cases, the template generator 340 may not automatically generate the communication template for an action until that action is selected by a user. In other cases, the template generator 340 may generate the templates to display to the user alongside the corresponding action suggestion.

The user device 305 may provide user feedback to the Signals Platform 310. In some cases, this user feedback may be implicit user feedback. For example, if a user selects to perform a certain action in response to a communication message 315, the user device 305 may send an indication of the selected action to the database server. The database server may update the validity of its binary classifier 320, entity extractor 325, action identifier 335, or some combination of these components based on the communication message 315 and the corresponding selected action. In other cases, this user feedback may be explicit user feedback. For example, the user may flag or otherwise indicate whether or not a binary classification, an extracted entity, a suggested action, a generated template, or some combination of these is accurate based on the received communication message 315. The user may provide such explicit feedback using a feedback button displayed in the user interface of the user device 305. Based on the user feedback, the Signals Platform 310 may modify the NLP process, the action recommendation process, or any other part of the Signals Platform 310 functionality to more accurately classify messages, extract metadata, and suggest actions. Additionally or alternatively, the database server or user device 305 may update the template generation process based on the feedback.

The template generation and action indication at the user device 305 may vary based on the application or client running on the user device 305. Some functionality of the user device 305 and Signals Platform 310 may be client agnostic (e.g., binary classification may be universal to all clients). These clients may include Google Chrome, Microsoft Outlook, iOS, Android, etc. Other functionality for the user device 305 or Signals Platform 310 may be client-specific (e.g., based on capabilities or configurations of the client), such as the actions that may be suggested or the communication templates that may be generated.

Additionally or alternatively, based on the action selection process being user-specific, as opposed to device-specific, the database server may track user feedback across devices. For example, a user may select to perform a first suggested action for a client (e.g., Microsoft Outlook) at the user device 305. If the user then logs in or views the same client—Microsoft Outlook—on a second user device (not pictured), the second user device may not suggest the first action again, as the database server may identify that this action was already performed, albeit on a different user device. In this way, a user may not be prompted to perform a same action twice if using more than one user device 305 to interact with an application.

In some cases, the Signals Platform 310 or user device 305 may track how often each action is selected in response to each message type. The percentage corresponding to the number of times an action is selected versus the number of times the action is suggested may be referred to as a "predication accuracy" of the action. The prediction accuracy for each action may be compared to a prediction accuracy threshold. If the prediction accuracy is greater than the predication accuracy threshold (e.g., for a 95% threshold, if a user selects to send a calendar invite 98% of the time in response to a scheduling intent email), the user device 305 may automatically perform the action, rather than wait for the user to select the action. The prediction accuracy threshold may be configurable by each user, and may include functionality to turn this feature off. In some cases, the user device 305 or database server may calculate and store user-specific prediction accuracies and prediction accuracy thresholds for each action-message type combination.

Figure 4:
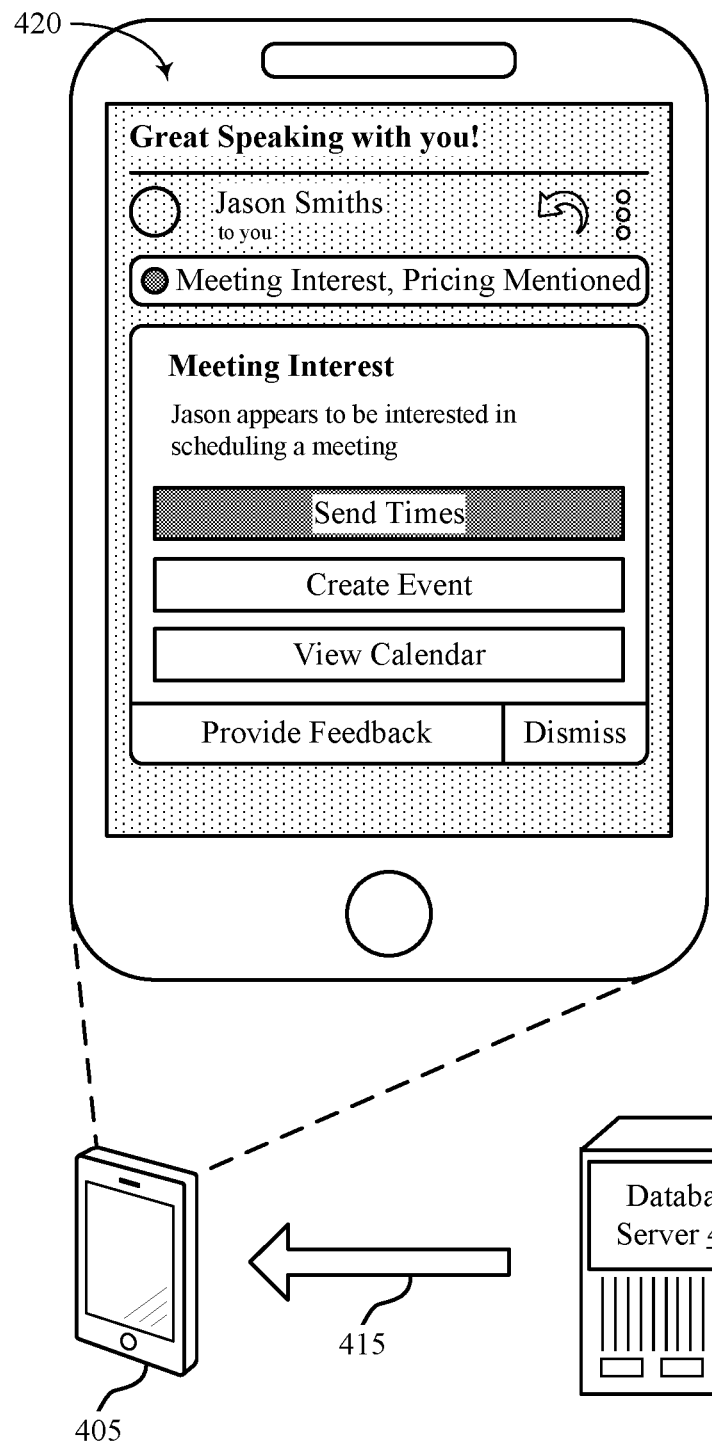
FIG. 4 illustrates an example action suggestion process that supports action response selection based on communication message analysis in accordance with various aspects of the present disclosure.

FIG. 4 illustrates an example action suggestion process 400 that supports action response selection based on communication message analysis in accordance with various aspects of the present disclosure. The example action suggestion process 400 may include a user device 405 receiving instructions and/or indications of suggested actions from a database server 410 (e.g., over communication link 415), as described above with reference to FIGS. 2 and 3. The user device 405 may display the suggested actions in a user interface 420, and a user operating the user device 405 may interact with the user interface 420 in order to perform the suggest actions or provide feedback about the action selection process. As illustrated, the user device 405 and database server 410 may support communication message analysis and action response selection in a sales-specific environment. For example, a user operating the user device 405 may be an example of a sales representative responding to customer or prospective customer inquiries over email communications. The action response selection may highlight key insights for the user and may pair these insights with actionable suggestions, thereby prioritizing the user's inbox and improving the efficiency of email responses for the user.

The user interface 420, as illustrated, is one possible example of a user interface 420 for action suggestion. In this exemplary case, the user may receive an email from a send (i.e., "Jason Smiths"). The database server 410 may classify the email as including a meeting interest insight and a pricing mentioned insight. The database server 410 may additionally determine a set of actions to respond to each of these insights. For example, to respond to the meeting interest, the database server 410 may suggest a "Send Times" action, a "Create Event" action, and a "View Calendar" action. The database server 410 or the user device 405 may additionally generate a communication template corresponding to each of these actions. In some cases, if the user selects (e.g., clicks on) one of these actions, the user interface 420 may display the corresponding generated template, and may allow the user to modify the template if desired. Additionally, the user may select to provide feedback based on the identified insights, the suggested actions, or the generated templates. If the user selects to perform one of the actions, the user device may send a communication template corresponding to that action.

Figure 5:
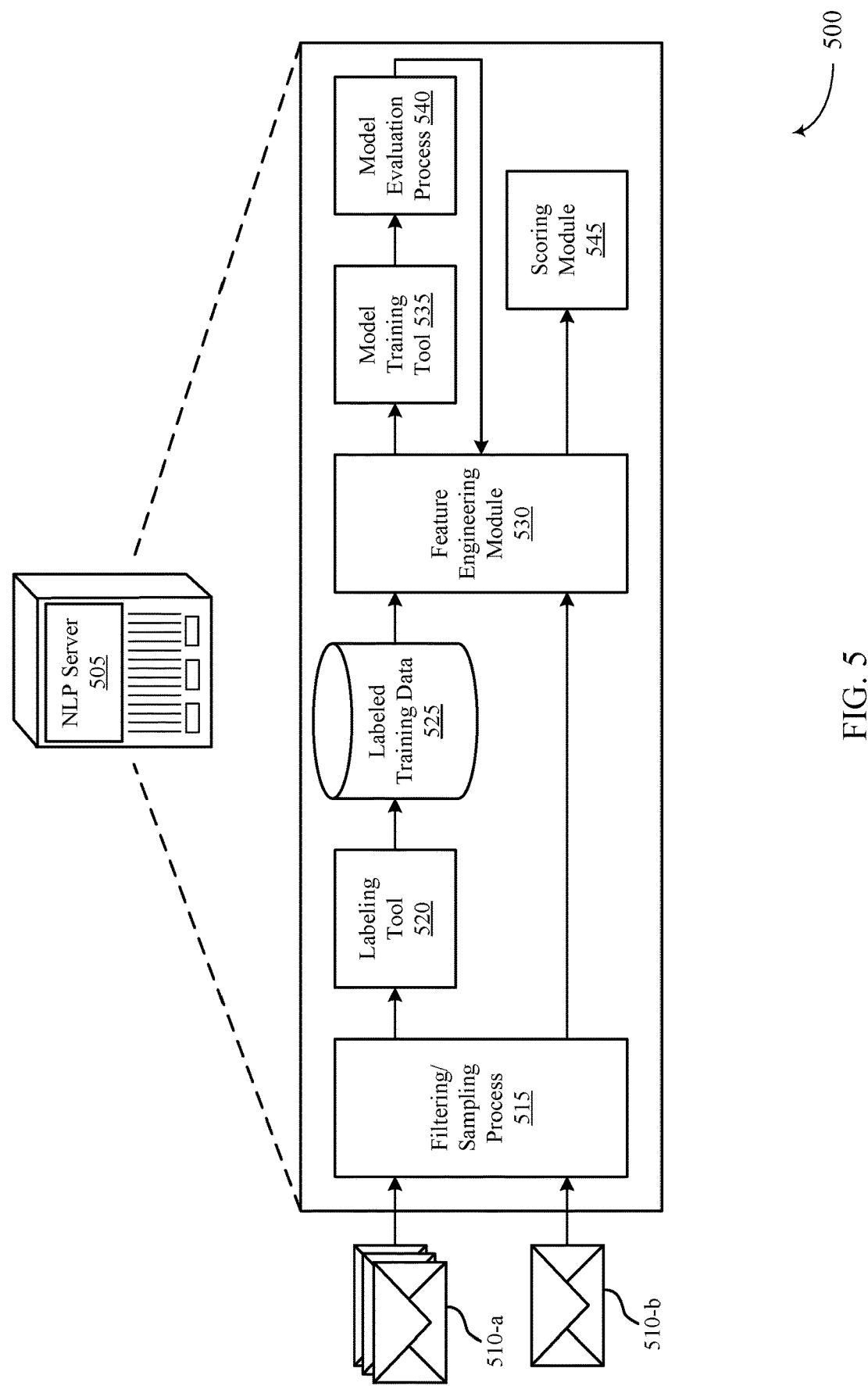
FIG. 5 illustrates an exemplary natural language processing (NLP) procedure that supports action response selection based on communication message analysis in accordance with various aspects of the present disclosure.

FIG. 5 illustrates an exemplary NLP procedure 500 that supports action response selection based on communication message analysis in accordance with various aspects of the present disclosure. A database server, such as an NLP server 505, may utilize the exemplary NLP procedure 500 to analyze text within a communication message. This NLP server 505 may be an example of a database server as described above, for example, with respect to FIGS. 2 through 4. The NLP server 505 may receive communication messages 510 as input and may perform multiple procedures in order to construct a model for determining insights and extracting metadata from a communication message 510.

In order to train the model, the NLP server 505 may process sets of historical data or training data, such as communication messages 510-*a*. The NLP server 505 may perform a set of data services, including data parsing, validation, filtering, extraction, sampling, labeling, or any combination of these services, to analyze the communications. Once the NLP server 505 determines a model, the NLP server 505 may utilize the model to analyze communication messages 510 in realtime or pseudo-realtime, and may or may not continue to update the model based on the incoming messages and user feedback. While specific NLP techniques are described below, it is to be understood that many other possible NLP techniques may be implemented in this system to analyze communication messages 510.

Each communication message of the training set of communication messages 510-*a* may pass to a filtering/sampling process 515. This filtering/sampling process 515 may filter out communication messages 510 based on consent, whether the message is classified as internal or external, based on language or size of the message, based on a volume of messages associated with a user of the message, or based on any other filtering criteria. In some cases, the filtering/sampling process 515 may include data parsing using activity schema such as a body extractor, reply chain remover, confidentiality remover, conference call parser, or signature parser. These processes may reduce the amount of unimportant noise in a communication message 510 (e.g., an email) so that the NLP server 505 may more accurately determine important characteristics of the message. The filtering/sampling process 515 may additionally or alternatively perform data validation, where the NLP server 505 may use notebooks to check fields within the communication messages 510 and efficiently validate these communication messages 510 at scale. Data validation may identify corrupted messages or messages missing vital information for analysis, and may remove these messages without further analysis.

The NLP server 505 may send the communication messages 510 to a labeling tool 520. The labeling tool 520 may label each communication message 510 with any number of labels based on an NLP procedure. These labels may correspond to insights or moments identified within the message.

In some cases, users (e.g., developers or system administrators) may manually label data in the labeling tool 520. However, such a system may be very inefficient when processing large sets of communications. Instead, the labeling tool 520 may utilize multiple techniques for efficiently automating the labeling process. For example, the labeling tool 520 may implement features such as word-to-vector to perform these processes. The labeling tool 520 may implement a high-recall filter to reduce the number of communication messages 510 while focusing on a subset of the messages more likely to include certain insights or moments. The high-recall filter may include building a relationship graph for the messages and implementing a word-to-vector technique. Word-to-vector may be an example of a neural network that analyzes text from the messages and generates a high-dimensional vector space including word vectors from the text. Word-to-vector may determine symbols, words, or phrases that are commonly found in proximity to other symbols, words, or phrases in the analyzed communication messages 510, and may associate these proximate entities in the vector space. In some cases, word-to-vector may search for unigrams (e.g., single symbols or words), n-grams (e.g., n-word phrases), or a combination of these, for example, based on a modeling configuration.

To improve the performance of a feature like word-to-vector, the labeling tool 520 may perform extraction, normalization, anonymization, or some combination of these processes on the communication messages 510. For extraction, the labeling tool 520 may extract just a portion of the communication messages 510 to analyze. For example, in the case of an email, the labeling tool 520 may perform word-to-vector analysis on the body of the email, but not on the introduction, signature, confidentiality notice, reply chain, or some combination of these portions. Analyzing these other portions may result in associating words or phrases that are not significant in determining how to respond to a message. Normalization and anonymization may involve replacing certain symbols, words, or phrases in a message with placeholders. For example, a normalizer may replace specific prices or dates with the broader placeholders "PRICE" or "DATE." This may help with properly associating word vectors in the messages. Similarly, anonymization may replace specific names, phone numbers, addresses, social security numbers, etc. with generic placeholders, both for vectorization and confidentiality purposes. In some cases, the labeling tool 520 may utilize a technique such as word-to-vector to identify entities, such as metadata entities, within the message, and extract one or more of these entities. The labeling tool 520 may associate the extracted entities with the corresponding communication message 510 for further processing or analysis.

Labeled communication messages 510 may be stored in a labeled training data 525 database or disk. This labeled training data 525 may be used by a feature engineering module 530 to generate a model for the binary classification process. Feature engineering module 530 may implement classifying techniques utilizing text processing, such as latent Dirichlet allocation (LDA), term frequency-inverse document frequency (TF-IDF) information retrieval, or any other text processing techniques. Exemplary additional text processing techniques may include Deep Learning techniques, such as a recurrent neural networks (RNNs) with long short-term memory (LSTM) units, or any other Deep Learning techniques for NLP.

For example, in LDA, the feature engineering module 530 may group the communication messages 510 into classifications. LDA may take a communication message 510 as input, and may calculate a probability distribution for the message across the classifications. Scoring a message using LDA may result in a distribution of classifications, although these classifications may not be tied to any specific insight (e.g., a "pricing mention"). As with word-to-vector, the performance of LDA may improve if just a portion (e.g., the body) of a message is analyzed. In some cases, a base model may be generated (e.g., using manual labeling) before generating a high-recall filter or performing word-to-vector or LDA analysis on a message. These further processes may improve the model or expand the model to a superset of communication messages 510.

The classifications determined by the feature engineering module 530 may be passed to a model training tool 535. The model training tool 535 may use the classifications to update the NLP and binary classification models. The NLP server 505 may send these updated models to a model evaluation process 540, which may test the updated models against a set of test messages. The model evaluation process 540 may further refine the models based on running one or more tests, and may return these updated models to the feature engineering module 530. In some cases, the model evaluation process 540 may further include receiving user feedback, and updating the models based on the feedback. The updated models may be used on future messages sent to the feature engineering module 530—or, in some cases, the filtering/sampling process 515 or the labeling tool 520—to analyze the messages.

For example, a user device may send the NLP server 505 a new communication message 510-b in pseudo-realtime as part of a communication intake stream. The NLP server 505 may send the new communication message 510-b through the filtering/sampling process 515 (e.g., which may include graph or word-to-vector analysis), through the feature engineering module 530 (e.g., which may classify the message using text processing or LDA), and to a scoring module 545. This message flow may be referred to as the scoring pipeline. The scoring module 545 may calculate a score based on the accuracy or a confidence level associated with the classification or entity extraction of the new communication message 510-b. In this way, the NLP server 505 may not just extract entities and classify a communication message 510, but may additionally determine which metadata or classifications are more likely to be accurate or helpful to a user.

Figure 6:
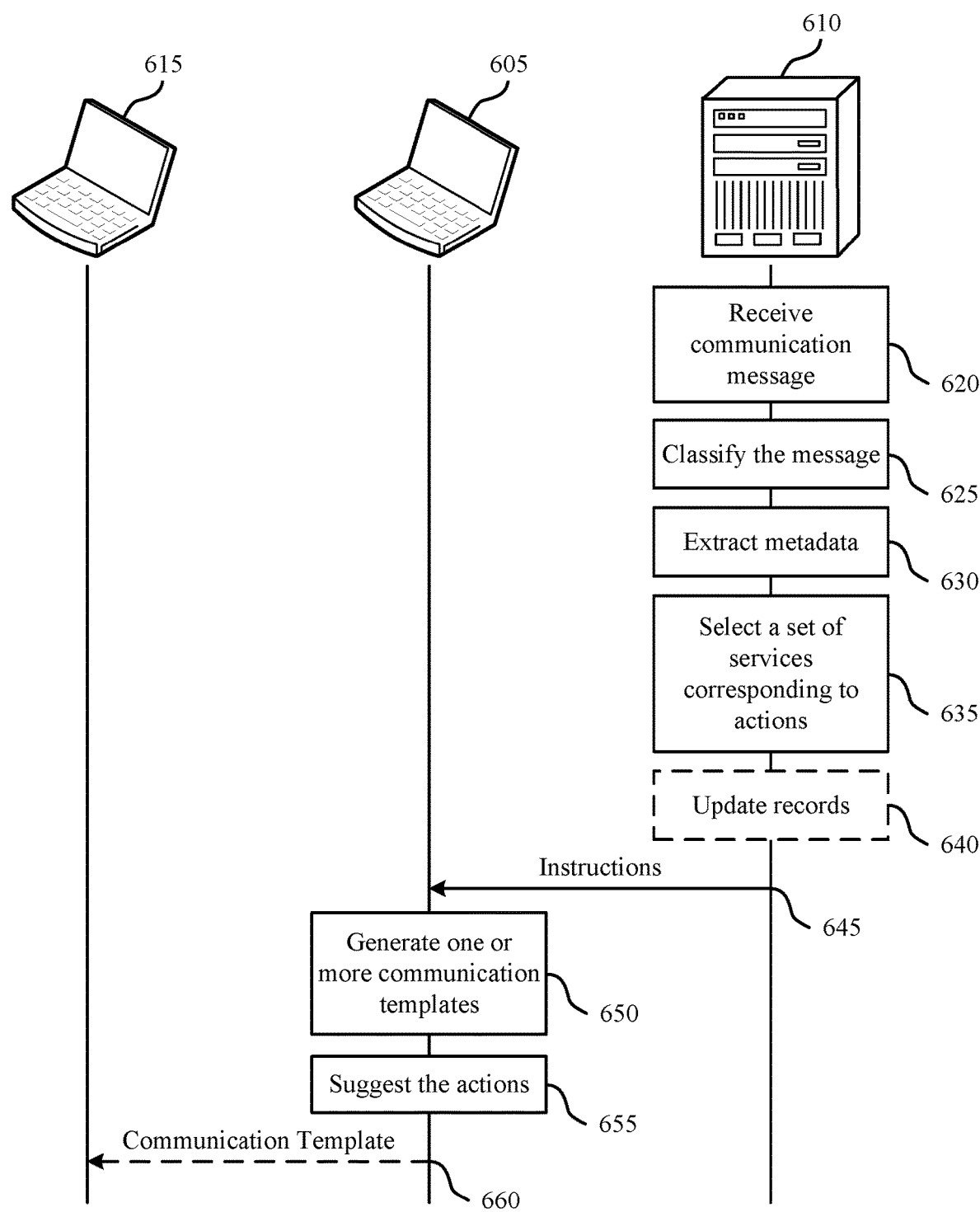
FIG. 6 illustrates an example of a process flow that supports action response selection based on communication message analysis in accordance with various aspects of the present disclosure.

FIG. 6 illustrates an example of a process flow 600 that supports action response selection based on communication message analysis in accordance with various aspects of the present disclosure. The process flow 600 may include a first user device 605, a database server 610, and a second user device 615. The first user device 605 and the database server 610 may be examples of the corresponding devices described with respect to FIGS. 2 through 4. The first user device 605 may be associated with a first user or a corresponding first user identifier, and the second user device 615 may be associated with a second user or a second user identifier. The first user may have access to the database server 610. For example, with reference to FIG. 1, the first user device 605 may be an example of a cloud client 105, the database server 610 may be an example of a component of a cloud platform 115 or a data center 120, and the second user device 615 may be an example of a contact 110 or, in some cases, a different cloud client 105.

At 620, the database server 610 may receive a communication message. In some cases, the communication message may be an example of a communication message sent from the second user device 615 to the first user device 605. The communication message may be an example of an email, a calendar event, a service ticket, a text message, a voice call, a social media message, or some other similar form of communication message. The database server 610 may receive the communication from the second user device 615 when the communication message is transmitted to the first user device 605, or the database server 610 may receive the communication message as a forwarded message from the first user device 605 either automatically or based on an input from the user.

At 625, the database server 610 may classify the communication message with one or more binary classifications. For example, the database server 610 may perform NLP on text—or a text transcript of a voice recording—of the communication message. This NLP analysis may include any number of NLP techniques, such as Entities, Noun phrases, Top unigrams, bigrams, topics, semantic word vector representations, or any other NLP techniques, such as those described with reference to FIG. 5. The binary classifications may in some cases be referred to as insights or moments, and may include a scheduling intent insight, a pricing request insight, an out of office response insight, a competitor mentioned insight, an executive added insight, or any other similar CRM-related insight that may be derived from the text of a communication message.

At 630, the database server 610 may additionally extract metadata from the communication message. In some cases, the extracted metadata may be an example of symbols, words, or phrases associated with a date or multiple dates (e.g., "Thu-Fri October 26-27"). In these cases, the database server 610 may convert these symbols, words, or phrases into a format usable by an application (e.g., converting "Thu-Fri" into "Thursday and Friday," inferring that "October 26-27" refers to Oct. 26 and 27, 2017, and generating a corresponding date object, Metadata-Days: [2017-10-26 PST, 2017-10-27 PST]). Other examples of metadata may include names, titles, email addresses, phone numbers, businesses, locations, currency amounts, numbers, etc.

At 635, the database server 610 may select a set of services corresponding to a set of actions, where the actions are in response to the receipt of the communication message at the first user device 605. The services may be selected from a list of possible services stored at the database server 610, and may be selected based on the binary classifications, the extracted metadata, or both. For example, the database server 610 may include a service selection process or algorithm that receives the binary classifications, metadata, or both as input, and outputs the set of services. This service selection process may be universal, tenant-specific, or user-specific. Similarly, the processes for binary classification and metadata extraction may be universal, tenant-specific, or user-specific.

At 640, the database server 610 may optionally update records based on the communication message. For example, this may include updating data records stored in a database, or updating records in a web or native application.

At 645, the database server 610 may send instructions to an application running on the first user device 605 indicating the selected set of services. For example, if the communication message is an email, the instructions may be sent to an email application at the first user device 605 that received the communication message from the second user device 615. The database server 610 may send these instructions to the first user device 605 using a push method, or may send the instructions using a pull method (e.g., where the first user device 605 sends an instruction request message to the database server 610 to retrieve the instructions).

At 650, the first user device 605 may generate one or more communication templates based on the instructions. The communication templates may incorporate information from the binary classifications, the extracted metadata, or both. Each communication template may correspond to one or more of the actions. For example, for a 'generating an email' action, the communication template may be an example of an email message automatically configured using the binary classifications, extracted metadata, or both. Other examples of actions include indicating an available time, creating a calendar event, viewing a calendar, sending an email, viewing contact details, creating a task (e.g., in an application), creating a notification message, or any other action that may be performed by the application running on the first user device 605. Other examples of communication templates may include calendar invites, notifications, documents, etc. The communication templates—before configuration with the binary classification or metadata information—may be stored at the database server 610 or in the application at the first user device 605. In some cases, the application at the first user device 605 may be configured to process a subset of the instructions or generate a subset of the communication templates indicated by the instructions based on the capabilities of the application.

At 655, the first user device 605 may suggest the actions to the first user. The first user device 605 may display the possible set of actions in a user interface of the application. Additionally, the first user device 605 may display the generated communication templates to the first user for review or revision.

In some cases, the first user may select one or more actions to perform. These actions may respond in some way to the communication message initially received from the second user device 615. For example, the action may involve the first user device 605 transmitting the communication template (e.g., an email, calendar invite, etc.) to the second user device 615 at 660. If the user selects an action to perform, the first user device 605 may send an indication of the selected action to the database server 610 as user feedback. The database server 610 may update the service selection process, the binary classification process, the metadata extraction process, or some combination of these processes in response to the user feedback. Additionally or alternatively, the database server 610 or the first user device 605 may keep track of the suggested actions and the corresponding selected actions. If an action is selected above a certain threshold proportion of times when that action is suggested, the database server 610 may modify the instructions or the first user device 605 may modify its processing to automatically perform the action (e.g., as opposed to simply suggesting the action, and only performing the action if the action is selected by a user). This may improve the efficiency of the system when dealing with actions that are almost always performed in response to certain types of communication messages.

Figure 7:
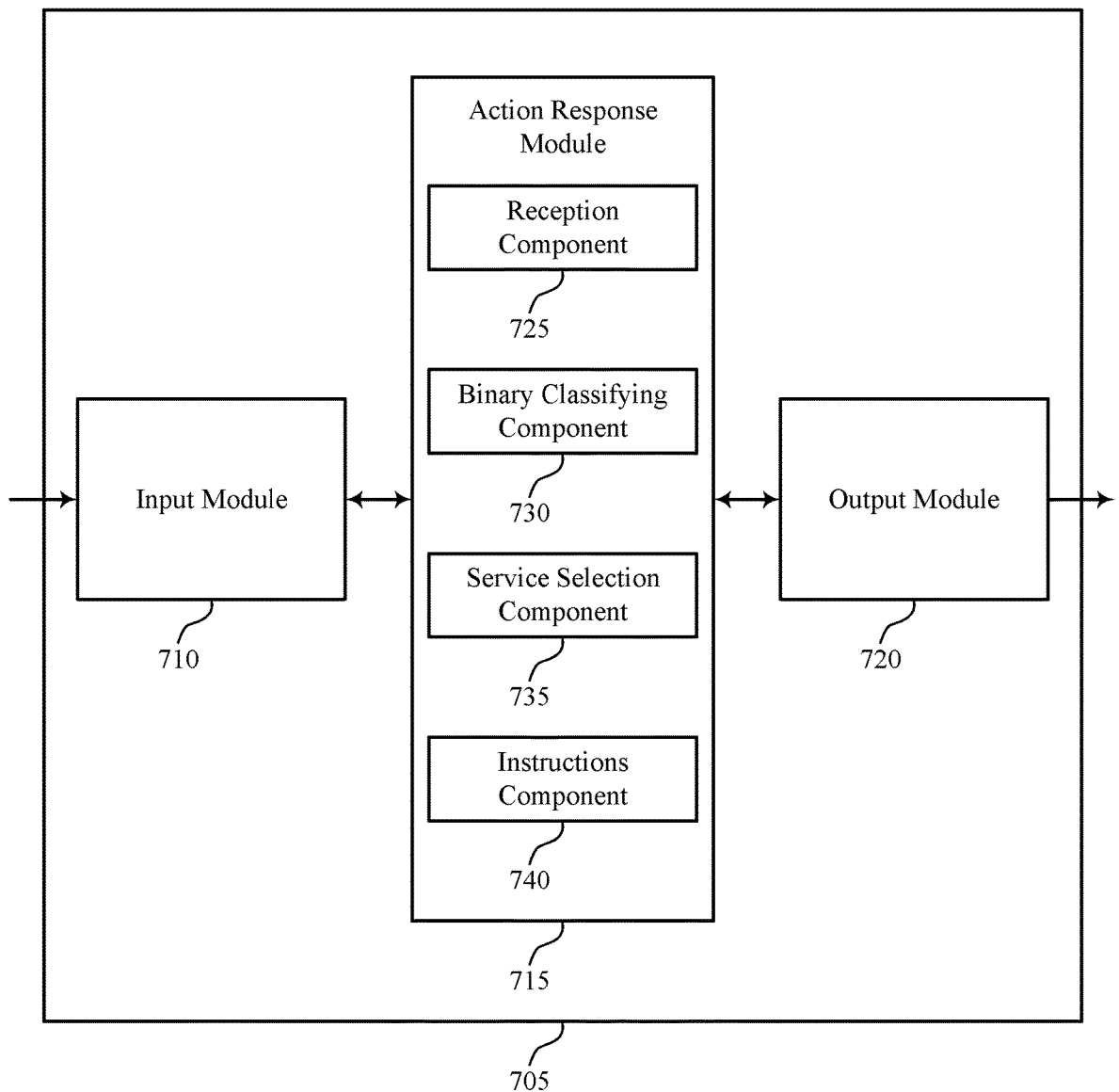
FIGS. 7 and 8 show block diagrams of a device that supports action response selection based on communication message analysis in accordance with aspects of the present disclosure.

FIG. 7 shows a block diagram 700 of an apparatus 705 that supports action response selection based on communication message analysis in accordance with aspects of the present disclosure. Apparatus 705 may include input module 710, action response module 715, and output module 720. Apparatus 705 may also include a processor. Each of these components may be in communication with one another (e.g., via one or more buses). In some cases, apparatus 705 may be an example of a user terminal, a database server, or a system containing multiple computing devices.

Action response module 715 may be an example of aspects of the action response module 915 described with reference to FIG. 9. Action response module 715 may also include reception component 725, binary classifying component 730, service selection component 735, and instructions component 740.

Action response module 715 and/or at least some of its various sub-components may be implemented in hardware, software executed by a processor, firmware, or any combination thereof. If implemented in software executed by a processor, the functions of the action response module 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The action response module 715 and/or at least some of its various sub-components may be physically located at various positions, including being distributed such that portions of functions are implemented at different physical locations by one or more physical devices. In some examples, action response module 715 and/or at least some of its various sub-components may be a separate and distinct component in accordance with various aspects of the present disclosure. In other examples, action response module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Reception component 725 may receive a communication message. In some cases, the communication message includes an email, a calendar event, a service ticket, a short message service (SMS) text message, a voice call, a social media message, or a combination thereof.

Binary classifying component 730 may classify the communication message with one or more binary classifications, where the classifying is based on an NLP analysis of text of the communication message. In some cases, the one or more binary classifications include a scheduling intent insight, a pricing request insight, an out of office response insight, a competitor mentioned insight, an executive added insight, or a combination thereof.

Service selection component 735 may select, from a stored list of possible services on the database server, a set of services that correspond to a set of actions that are in response to the receipt of the communication message and that are based on the one or more binary classifications. In some cases, the set of actions includes indicating an available time, creating a calendar event, viewing a calendar, generating an email, sending an email, viewing contact details, creating a task, creating a notification message, or a combination thereof.

Instructions component 740 may send instructions indicating the selected set of services to an application, the instructions instructing the application to automatically generate a communication template that incorporates information based on the classified one or more binary classifications, where the communication template corresponds to at least one action of the set of actions. In some cases, instructions component 740 receive an instruction request from the application, where sending the instructions to the application is based on receiving the instruction request. In some cases, the instructions instruct the application to automatically generate a set of communication templates, and the application generates a subset of the set of communication templates based on one or more capabilities of the application. In some cases, the communication template includes an email, a calendar invite, a notification, a document, or a combination thereof.

Figure 8:
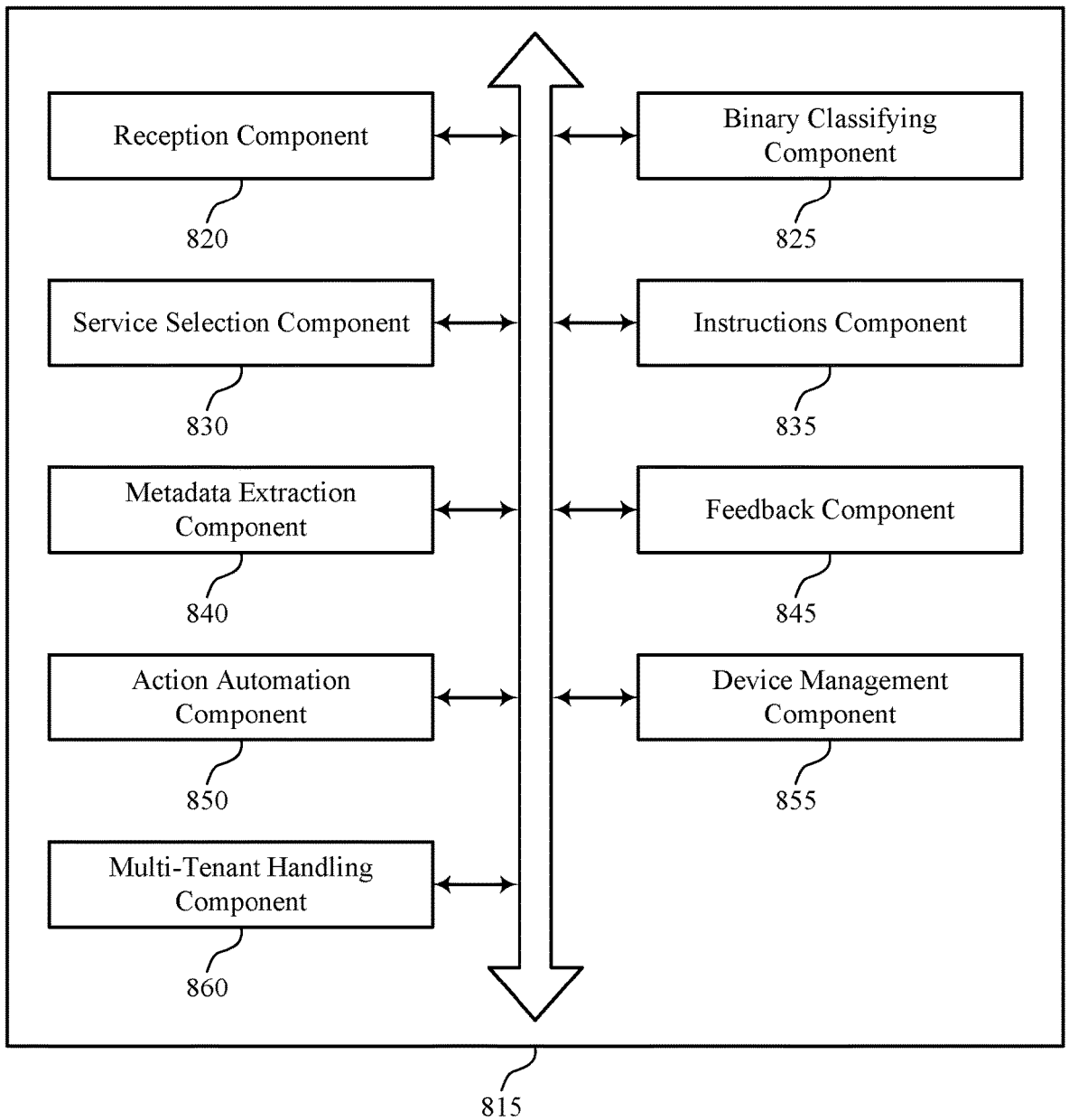

FIG. 8 shows a block diagram 800 of an action response module 815 that supports action response selection based on communication message analysis in accordance with aspects of the present disclosure. The action response module 815 may be an example of aspects of an action response module 715 or 915 described with reference to FIGS. 7 and 9. The action response module 815 may include reception component 820, binary classifying component 825, service selection component 830, instructions component 835, metadata extraction component 840, feedback component 845, action automation component 850, device management component 855, and multi-tenant handling component 860. Each of these modules may communicate, directly or indirectly, with one another (e.g., via one or more buses).

Reception component 820 may receive a communication message. In some cases, the communication message includes an email, a calendar event, a service ticket, an SMS text message, a voice call, a social media message, or a combination thereof.

Binary classifying component 825 may classify the communication message with one or more binary classifications, where the classifying is based on an NLP analysis of text of the communication message. In some cases, the one or more binary classifications include a scheduling intent insight, a pricing request insight, an out of office response insight, a competitor mentioned insight, an executive added insight, or a combination thereof.

Service selection component 830 may select, from a stored list of possible services on the database server, a set of services that correspond to a set of actions that are in response to the receipt of the communication message and that are based on the one or more binary classifications. In some cases, the set of actions includes indicating an available time, creating a calendar event, viewing a calendar, generating an email, sending an email, viewing contact details, creating a task, creating a notification message, or a combination thereof.

Instructions component 835 may send instructions indicating the selected set of services to an application, the instructions instructing the application to automatically generate a communication template that incorporates information based on the classified one or more binary classifications, where the communication template corresponds to at least one action of the set of actions. In some cases, instructions component 835 may receive an instruction request from the application, where sending the instructions to the application is based on receiving the instruction request. In some cases, the instructions instruct the application to automatically generate a set of communication templates, and the application generates a subset of the set of communication templates based on one or more capabilities of the application. In some cases, the communication template includes an email, a calendar invite, a notification, a document, or a combination thereof.

Metadata extraction component 840 may extract metadata from the communication message, where selecting the set of services that correspond to the set of actions is further based on the extracted metadata. In some cases, the extracted metadata includes one or more symbols, words, or phrases associated with a date. The metadata extraction component 840 may convert the one or more symbols, words, or phrases into a date object formatted for use at the application.

Feedback component 845 may receive user feedback based on one or more actions of the set of actions performed at the application, and may modify a service selection process based on the received user feedback. Action automation component 850 may calculate a prediction accuracy for each action of the set of actions based on the received user feedback, where the instructions indicate to the application to automatically perform an action of the set of actions if the prediction accuracy associated with the action is greater than a threshold prediction accuracy.

In some cases, the application may run on a first device. Device management component 855 may send additional instructions indicating a subset of the selected set of services to the application running on a second device, where the subset of the selected set of services is based on any actions of the set of actions performed by the application running on the first device. Multi-tenant handling component 860 may classify the communication message, select the set of services, or both based on a tenant-specific selection process in a multi-tenant system, a user-specific selection process, or a combination thereof.

Figure 9:
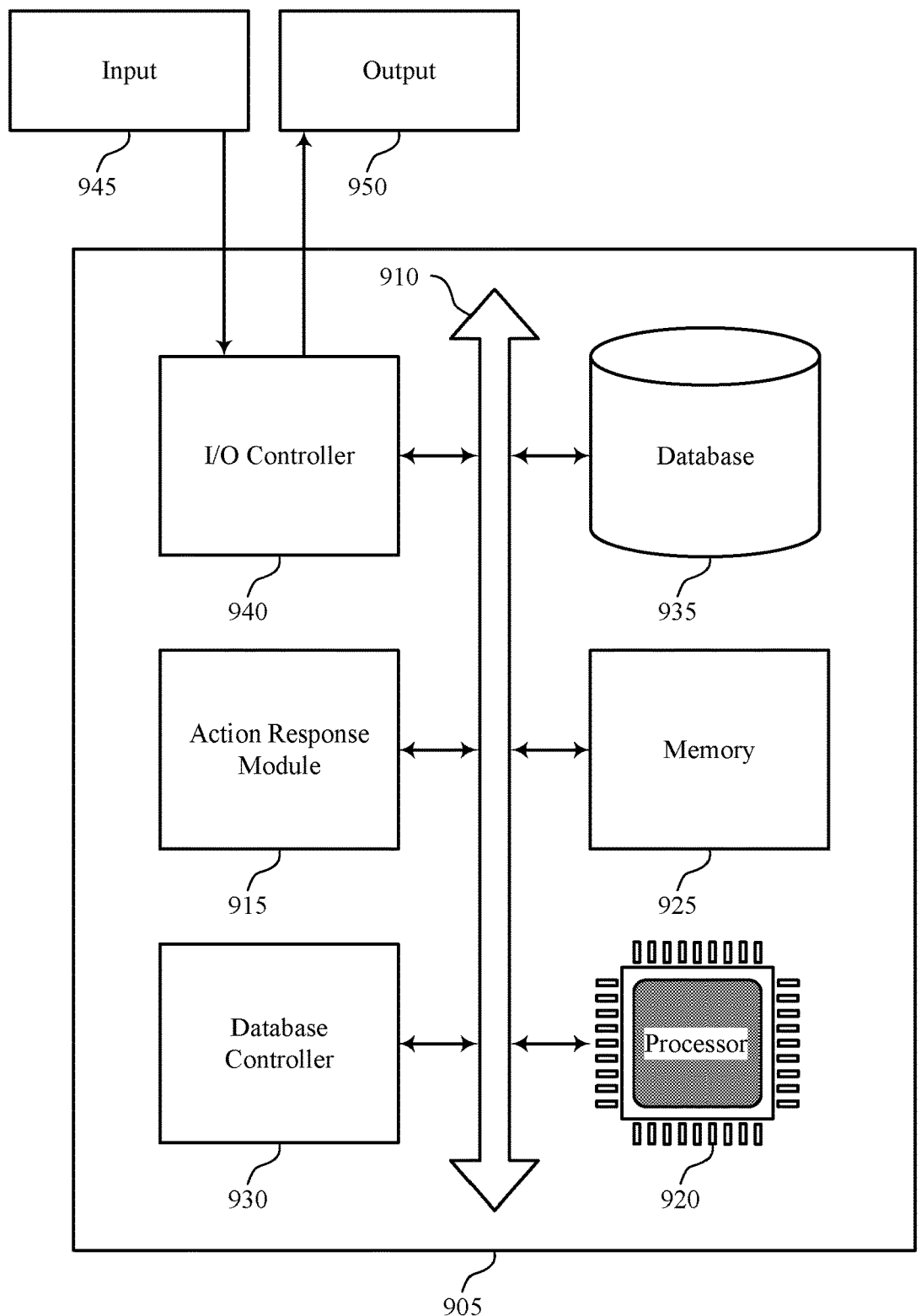
FIG. 9 illustrates a block diagram of a system including a database server that supports action response selection based on communication message analysis in accordance with aspects of the present disclosure.

FIG. 9 shows a diagram of a system 900 including a device 905 that supports action response selection based on communication message analysis in accordance with aspects of the present disclosure. Device 905 may be an example of or include the components of a database server as described above, e.g., with reference to FIGS. 1 through 5. Device 905 may include components for bi-directional data communications including components for transmitting and receiving communications, including action response module 915, processor 920, memory 925, database controller 930, database 935, and I/O controller 940. These components may be in electronic communication via one or more buses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting action response selection based on communication message analysis).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Database controller 930 may manage data storage and processing in database 935. In some cases, a user may interact with database controller 930. In other cases, database controller 930 may operate automatically without user interaction. Database 935 may be an example of a single database, a distributed database, multiple distributed databases, or an emergency backup database.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system. In other cases, I/O controller 940 may represent or interact with a modem, a keyboard, a mouse, a touchscreen, or a similar device. In some cases, I/O controller 940 may be implemented as part of a processor. In some cases, a user may interact with device 905 via I/O controller 940 or via hardware components controlled by I/O controller 940.

Figure 10:
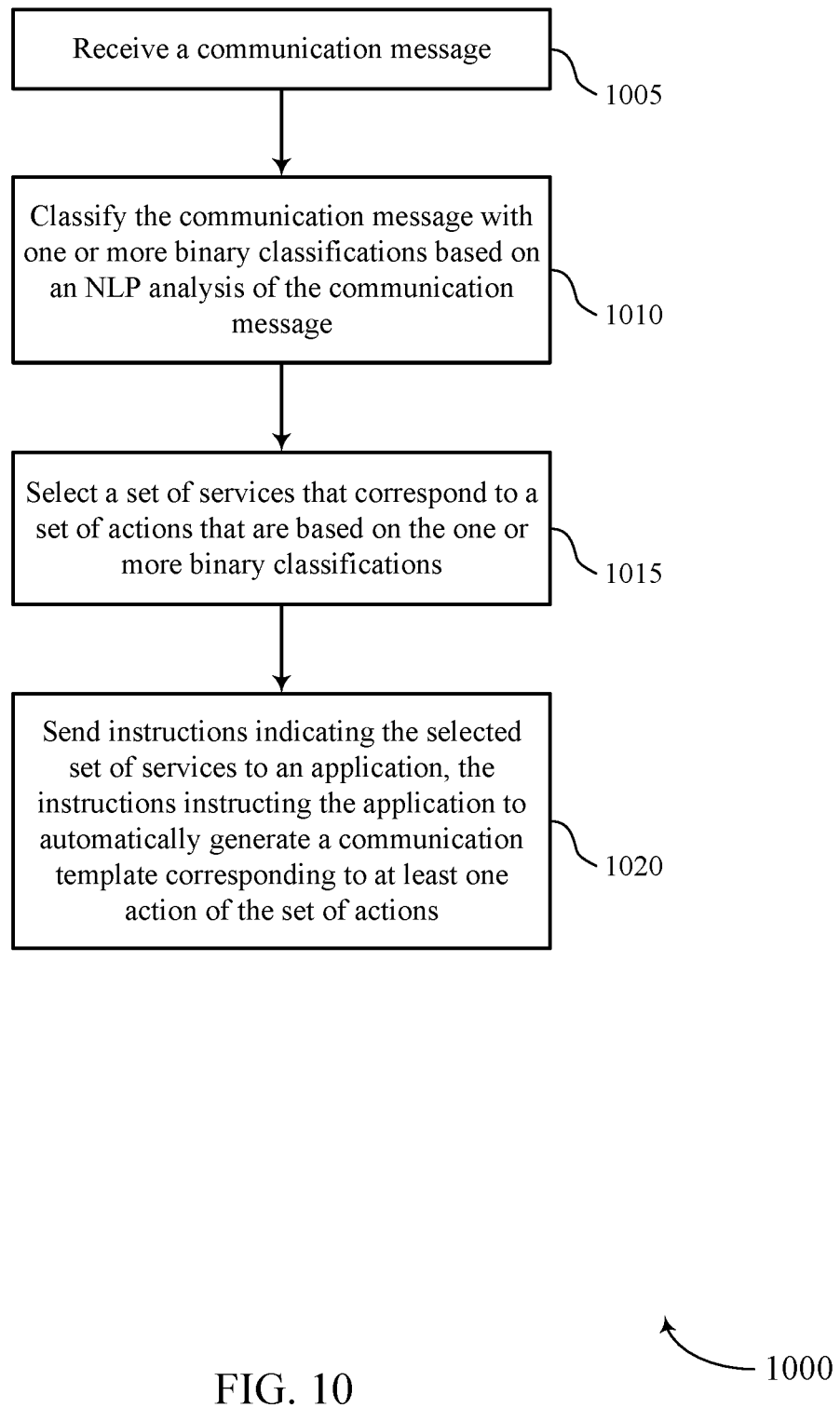
FIGS. 10 through 12 illustrate methods for action response selection based on communication message analysis in accordance with aspects of the present disclosure.

FIG. 10 shows a flowchart illustrating a method 1000 for action response selection based on communication message analysis in accordance with aspects of the present disclosure. The operations of method 1000 may be implemented by a database server or its components as described herein, for examples, with reference to FIGS. 1 through 5. For example, the operations of method 1000 may be performed by an action response module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1005 the database server may receive a communication message. The operations of 1005 may be performed according to the methods described herein. In certain examples, aspects of the operations of 1005 may be performed by a reception component as described with reference to FIGS. 7 through 9.

At 1010 the database server may classify the communication message with one or more binary classifications, where the classifying is based at least in part on an NLP analysis of text of the communication message. In some cases, the database server may filter received communication messages prior to classifying the communication messages. The operations of 1010 may be performed according to the methods described herein. In certain examples, aspects of the operations of 1010 may be performed by a binary classifying component as described with reference to FIGS. 7 through 9.

At 1015 the database server may select, from a stored list of possible services on the database server, a set of services that correspond to a set of actions that are in response to the receipt of the communication message and that are based at least in part on the one or more binary classifications. The operations of 1015 may be performed according to the methods described herein. In certain examples, aspects of the operations of 1015 may be performed by a service selection component as described with reference to FIGS. 7 through 9.

At 1020 the database server may send instructions indicating the selected set of services to an application, the instructions instructing the application to automatically generate a communication template that incorporates information based at least in part on the classified one or more binary classifications, where the communication template corresponds to at least one action of the set of actions. The operations of 1020 may be performed according to the methods described herein. In certain examples, aspects of the operations of 1020 may be performed by an instructions component as described with reference to FIGS. 7 through 9.

Figure 11:
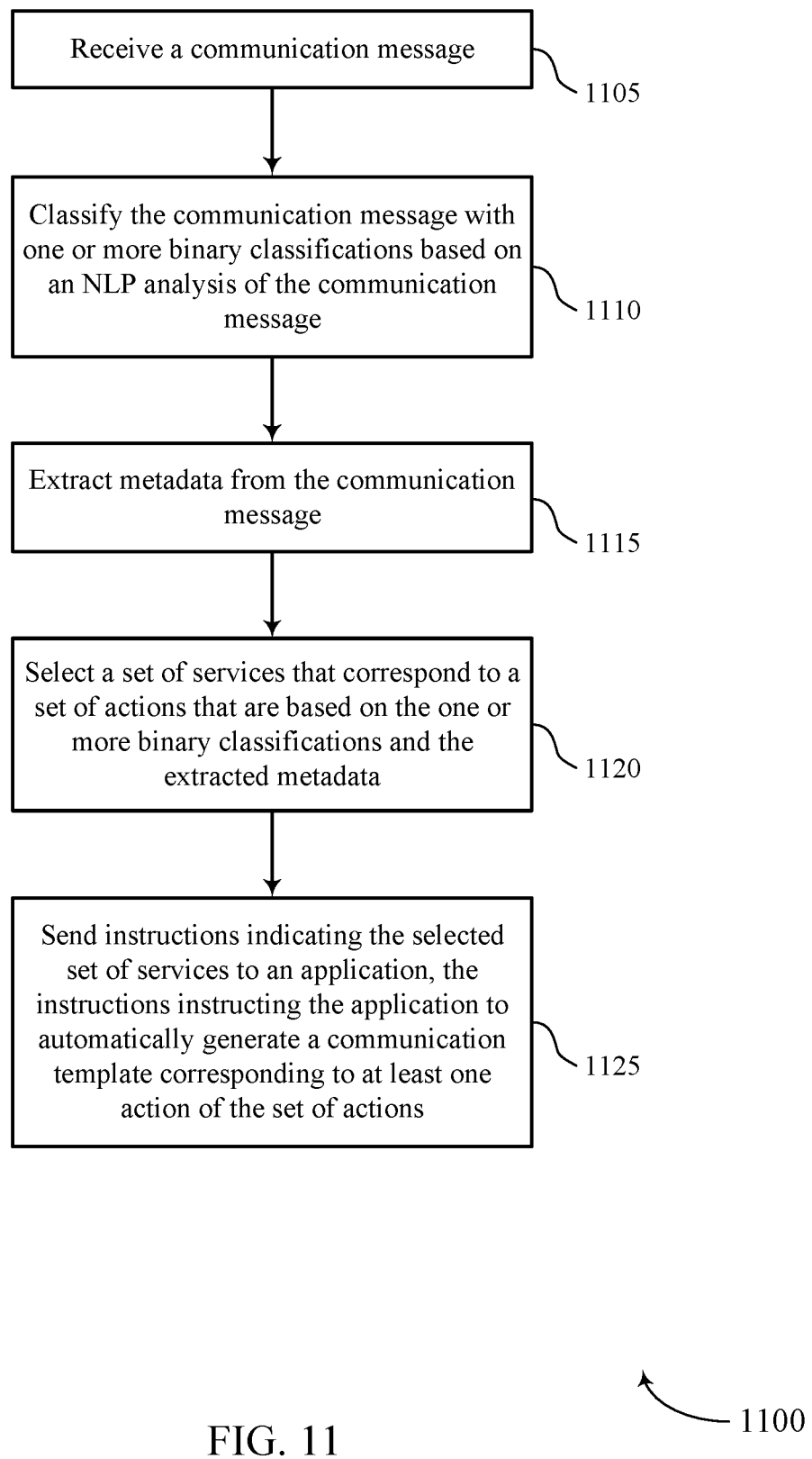

FIG. 11 shows a flowchart illustrating a method 1100 for action response selection based on communication message analysis in accordance with aspects of the present disclosure. The operations of method 1100 may be implemented by a database server or its components as described herein, for example, with reference to FIGS. 1 through 5. For example, the operations of method 1100 may be performed by an action response module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1105 the database server may receive a communication message. The operations of 1105 may be performed according to the methods described herein. In certain examples, aspects of the operations of 1105 may be performed by a reception component as described with reference to FIGS. 7 through 9.

At 1110 the database server may classify the communication message with one or more binary classifications, where the classifying is based at least in part on an NLP analysis of text of the communication message. The operations of 1110 may be performed according to the methods described herein. In certain examples, aspects of the operations of 1110 may be performed by a binary classifying component as described with reference to FIGS. 7 through 9.

At 1115 the database server may extract metadata from the communication message. The operations of 1115 may be performed according to the methods described herein. In certain examples, aspects of the operations of 1115 may be performed by a metadata extraction component as described with reference to FIGS. 7 through 9.

At 1120 the database server may select, from a stored list of possible services on the database server, a set of services that correspond to a set of actions that are in response to the receipt of the communication message and that are based at least in part on the one or more binary classifications. Furthermore, selecting the set of services that correspond to the set of actions may be further based at least in part on the extracted metadata. The operations of 1120 may be performed according to the methods described herein. In certain examples, aspects of the operations of 1120 may be performed by a service selection component as described with reference to FIGS. 7 through 9.

At 1125 the database server may send instructions indicating the selected set of services to an application, the instructions instructing the application to automatically generate a communication template that incorporates information based at least in part on the classified one or more binary classifications, where the communication template corresponds to at least one action of the set of actions. The operations of 1125 may be performed according to the methods described herein. In certain examples, aspects of the operations of 1125 may be performed by an instructions component as described with reference to FIGS. 7 through 9.

Figure 12:
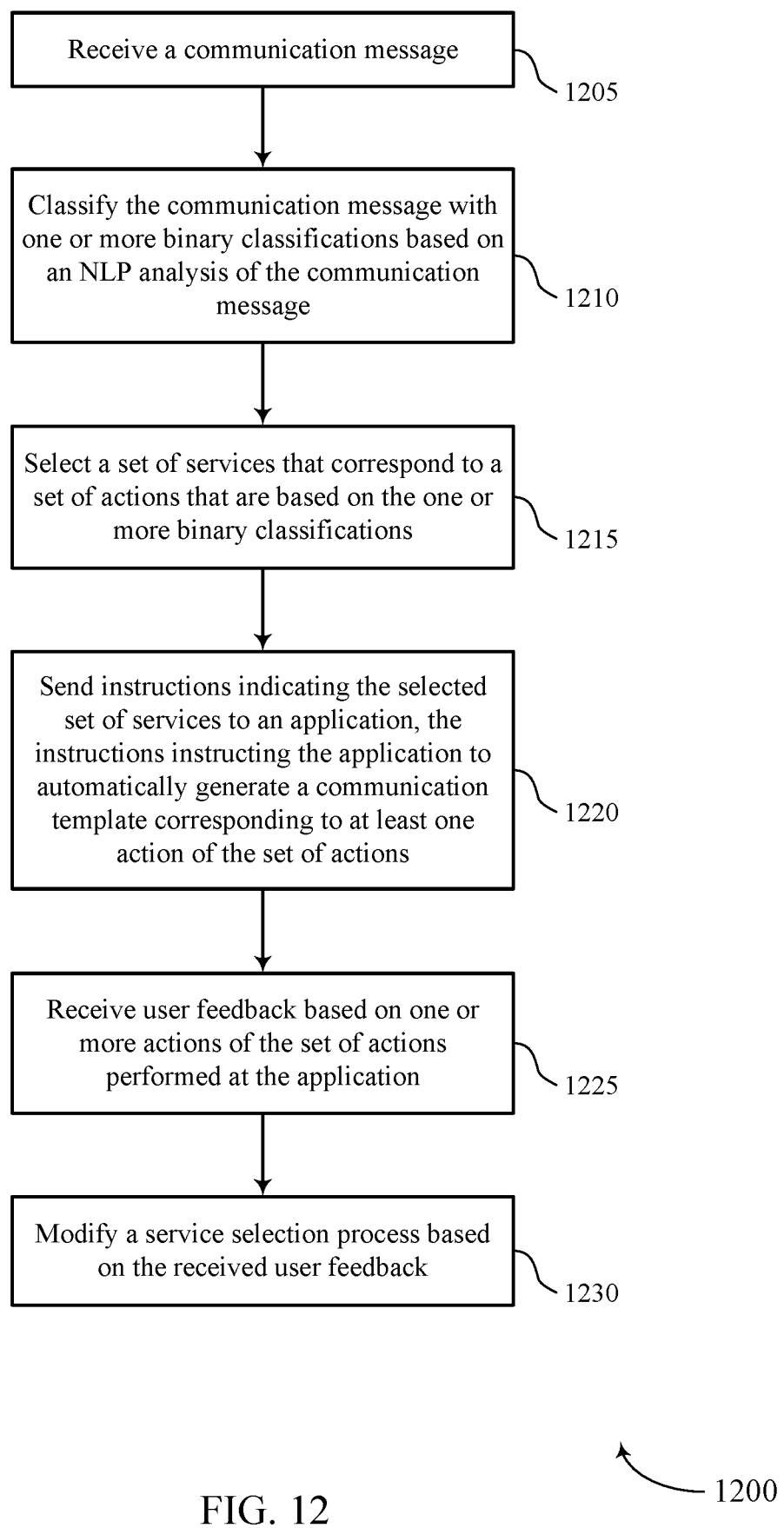

FIG. 12 shows a flowchart illustrating a method 1200 for action response selection based on communication message analysis in accordance with aspects of the present disclosure. The operations of method 1200 may be implemented by a database server or its components as described herein, for example, with respect to FIGS. 1 through 5. For example, the operations of method 1200 may be performed by an action response module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1205 the database server may receive a communication message. The operations of 1205 may be performed according to the methods described herein. In certain examples, aspects of the operations of 1205 may be performed by a reception component as described with reference to FIGS. 7 through 9.

At 1210 the database server may classify the communication message with one or more binary classifications, where the classifying is based at least in part on an NLP analysis of text of the communication message. The operations of 1210 may be performed according to the methods described herein. In certain examples, aspects of the operations of 1210 may be performed by a binary classifying component as described with reference to FIGS. 7 through 9.

At 1215 the database server may select, from a stored list of possible services on the database server, a set of services that correspond to a set of actions that are in response to the receipt of the communication message and that are based at least in part on the one or more binary classifications. The operations of 1215 may be performed according to the methods described herein. In certain examples, aspects of the operations of 1215 may be performed by a service selection component as described with reference to FIGS. 7 through 9.

At 1220 the database server may send instructions indicating the selected set of services to an application, the instructions instructing the application to automatically generate a communication template that incorporates information based at least in part on the classified one or more binary classifications, where the communication template corresponds to at least one action of the set of actions. The operations of 1220 may be performed according to the methods described herein. In certain examples, aspects of the operations of 1220 may be performed by an instructions component as described with reference to FIGS. 7 through 9.

At 1225 the database server may receive user feedback based at least in part on one or more actions of the set of actions performed at the application. The operations of 1225 may be performed according to the methods described herein. In certain examples, aspects of the operations of 1225 may be performed by a feedback component as described with reference to FIGS. 7 through 9.

At 1230 the database server may modify a service selection process based at least in part on the received user feedback. The operations of 1230 may be performed according to the methods described herein. In certain examples, aspects of the operations of 1230 may be performed by a feedback component as described with reference to FIGS. 7 through 9.

A method of communication data processing at a database server is described. The method may include receiving a communication message, and classifying the communication message with one or more binary classifications, wherein the classifying is based at least in part on an NLP analysis of text of the communication message. The method may further include selecting, from a stored list of possible services on the database server, a set of services that correspond to a set of actions that are in response to the receipt of the communication message and that are based at least in part on the one or more binary classifications, and sending instructions indicating the selected set of services to an application, the instructions instructing the application to automatically generate a communication template that incorporates information based at least in part on the classified one or more binary classifications, wherein the communication template corresponds to at least one action of the set of actions.

An apparatus for communication data processing at a database server is described. The apparatus may include a processor, memory in electronic communication with the processor, and instructions stored in the memory. The instructions may be operable to cause the processor to receive a communication message, and classify the communication message with one or more binary classifications, wherein the classifying is based at least in part on an NLP analysis of text of the communication message. The instructions may be further operable to cause the processor to select, from a stored list of possible services on the database server, a set of services that correspond to a set of actions that are in response to the receipt of the communication message and that are based at least in part on the one or more binary classifications, and send instructions indicating the selected set of services to an application, the instructions instructing the application to automatically generate a communication template that incorporates information based at least in part on the classified one or more binary classifications, wherein the communication template corresponds to at least one action of the set of actions.

A non-transitory computer-readable medium for communication data processing at a database server is described. The non-transitory computer-readable medium may include instructions operable to cause a processor to receive a communication message, and classify the communication message with one or more binary classifications, wherein the classifying is based at least in part on an NLP analysis of text of the communication message. The instructions may be further operable to cause the processor to select, from a stored list of possible services on the database server, a set of services that correspond to a set of actions that are in response to the receipt of the communication message and that are based at least in part on the one or more binary classifications, and send instructions indicating the selected set of services to an application, the instructions instructing the application to automatically generate a communication template that incorporates information based at least in part on the classified one or more binary classifications, wherein the communication template corresponds to at least one action of the set of actions.

Some examples of the method, apparatus, and non-transitory computer-readable medium described above may further include processes, features, means, or instructions for extracting metadata from the communication message, wherein selecting the set of services that correspond to the set of actions may be further based at least in part on the extracted metadata.

In some examples of the method, apparatus, and non-transitory computer-readable medium described above, the extracted metadata comprises one or more symbols, words, or phrases associated with a date. Some examples of the method, apparatus, and non-transitory computer-readable medium described above may further include processes, features, means, or instructions for converting the one or more symbols, words, or phrases into a date object formatted for use at the application.

Some examples of the method, apparatus, and non-transitory computer-readable medium described above may further include processes, features, means, or instructions for receiving user feedback based at least in part on one or more actions of the set of actions performed at the application. Some examples of the method, apparatus, and non-transitory computer-readable medium described above may further include processes, features, means, or instructions for modifying a service selection process based at least in part on the received user feedback.

Some examples of the method, apparatus, and non-transitory computer-readable medium described above may further include processes, features, means, or instructions for calculating a prediction accuracy for each action of the set of actions based at least in part on the received user feedback, wherein the instructions indicate to the application to automatically perform an action of the set of actions if the prediction accuracy associated with the action may be greater than a threshold prediction accuracy.

In some examples of the method, apparatus, and non-transitory computer-readable medium described above, the application may run on a first device. Some examples of the method, apparatus, and non-transitory computer-readable medium described above may further include processes, features, means, or instructions for sending additional instructions indicating a subset of the selected set of services to the application running on a second device, wherein the subset of the selected set of services may be based at least in part on any actions of the set of actions performed by the application running on the first device.

Some examples of the method, apparatus, and non-transitory computer-readable medium described above may further include processes, features, means, or instructions for receiving an instruction request from the application, wherein sending the instructions to the application may be based at least in part on receiving the instruction request.

In some examples of the method, apparatus, and non-transitory computer-readable medium described above, the instructions instruct the application to automatically generate a set of communication templates, and the application generates a subset of the set of communication templates based at least in part on one or more capabilities of the application.

In some examples of the method, apparatus, and non-transitory computer-readable medium described above, classifying the communication message, selecting the set of services, or both may be based at least in part on a tenant-specific selection process in a multi-tenant system, a user-specific selection process, or a combination thereof.

In some examples of the method, apparatus, and non-transitory computer-readable medium described above, the communication message comprises an email, a calendar event, a service ticket, an SMS text message, a voice call, a social media message, or a combination thereof.

In some examples of the method, apparatus, and non-transitory computer-readable medium described above, the one or more binary classifications comprise a scheduling intent insight, a pricing request insight, an out of office response insight, a competitor mentioned insight, an executive added insight, or a combination thereof.

In some examples of the method, apparatus, and non-transitory computer-readable medium described above, the set of actions comprises indicating an available time, creating a calendar event, viewing a calendar, generating an email, sending an email, viewing contact details, creating a task, creating a notification message, or a combination thereof.

In some examples of the method, apparatus, and non-transitory computer-readable medium described above, the communication template comprises an email, a calendar invite, a notification, a document, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication data processing at a database server, comprising:

receiving, at the database server, a copy of a communication message received by an application running on a first user device for a first user;

classifying the communication message with one or more binary classifications based at least in part on a natural language processing (NLP) analysis of text of the communication message;

selecting, from a stored list of possible services on the database server, a set of services that correspond to a set of actions that are in response to receiving the copy of the communication message and that are based at least in part on the one or more binary classifications;

sending indication instructions indicating the selected set of services to the application running on the first user device, the indication instructions instructing the application to automatically generate a communication template from the first user that is responsive to the communication message and that incorporates information based at least in part on the classified one or more binary classifications, wherein the communication template corresponds to at least one action of the set of actions;

receiving user feedback based at least in part on user input from the first user to the application running on the first user device, the user input triggering the application running on the first user device to perform an action of the set of actions; and sending additional indication instructions indicating a subset of the selected set of services to the application running on a second user device for the first user, the subset of the selected set of services corresponding to a subset of the set of actions comprising each action of the set of actions except for the performed action based at least in part on the user input triggering the application running on the first user device to perform the action.

2. The method of claim 1, further comprising:
extracting metadata from the communication message, wherein selecting the set of services that correspond to the set of actions is further based at least in part on the extracted metadata.

3. The method of claim 2, wherein the extracted metadata comprises one or more symbols, words, or phrases associated with a date, the method further comprising:
converting the one or more symbols, words, or phrases into a date object formatted for use at the application.

4. The method of claim 1, further comprising:
modifying a service selection process specific to the first user based at least in part on the received user feedback.

5. The method of claim 4, further comprising:
calculating a prediction accuracy for each action of the set of actions based at least in part on the received user feedback, wherein the indication instructions indicate to the application to automatically perform an additional action of the set of actions if the prediction accuracy associated with the additional action is greater than a threshold prediction accuracy.

6. The method of claim 1, further comprising:
receiving an instruction request from the application, wherein sending the indication instructions to the application is based at least in part on receiving the instruction request.

7. The method of claim 1, wherein the indication instructions instruct the application to automatically generate a set of communication templates, and the application generates a subset of the set of communication templates based at least in part on one or more capabilities of the application.

8. The method of claim 1, wherein classifying the communication message, selecting the set of services, or both are based at least in part on a tenant-specific selection process in a multi-tenant system, a user-specific selection process, or a combination thereof.

9. The method of claim 1, wherein the communication message comprises an email, a calendar event, a service ticket, a short message service (SMS) text message, a voice call, a social media message, or a combination thereof.

10. The method of claim 1, wherein the one or more binary classifications comprise a scheduling intent insight, a pricing request insight, an out of office response insight, a competitor mentioned insight, an executive added insight, or a combination thereof.

11. The method of claim 1, wherein the set of actions comprises indicating an available time, creating a calendar event, viewing a calendar, generating an email, sending an email, viewing contact details, creating a task, creating a notification message, or a combination thereof.

12. The method of claim 1, wherein the communication template comprises an email, a calendar invite, a notification, a document, or a combination thereof.

13. An apparatus for communication data processing at a database server, comprising:
a processor;
memory in electronic communication with the processor; and
instructions stored in the memory and executable by the processor to cause the apparatus to:
receive, at the database server, a copy of a communication message received by an application running on a first user device for a first user;
classify the communication message with one or more binary classifications based at least in part on a natural language processing (NLP) analysis of text of the communication message;
select, from a stored list of possible services on the database server, a set of services that correspond to a set of actions that are in response to receiving the copy of the communication message and that are based at least in part on the one or more binary classifications;
send indication instructions indicating the selected set of services to the application running on the first user device, the indication instructions instructing the application to automatically generate a communication template from the first user that is responsive to the communication message and that incorporates information based at least in part on the classified one or more binary classifications, wherein the communication template corresponds to at least one action of the set of actions;
receive user feedback based at least in part on user input from the first user to the application running on the first user device, the user input triggering the application running on the first user device to perform an action of the set of actions; and
send additional indication instructions indicating a subset of the selected set of services to the application running on a second user device for the first user, the subset of the selected set of services corresponding to a subset of the set of actions comprising each action of the set of actions except for the performed action based at least in part on the user input triggering the application running on the first user device to perform the action.

14. The apparatus of claim 13, wherein the instructions are further executable by the processor to cause the apparatus to:
extract metadata from the communication message, wherein the instructions executable by the processor to cause the apparatus to select the set of services that correspond to the set of actions are further executable by the processor to cause the apparatus to select the set of services that correspond to the set of actions further based at least in part on the extracted metadata.

15. The apparatus of claim 13, wherein the instructions are further executable by the processor to cause the apparatus to:
modify a service selection process specific to the first user based at least in part on the received user feedback.

16. The apparatus of claim 15, wherein the instructions are further executable by the processor to cause the apparatus to:
calculate a prediction accuracy for each action of the set of actions based at least in part on the received user feedback, wherein the indication instructions indicate to the application to automatically perform an additional action of the set of actions if the prediction accuracy associated with the additional action is greater than a threshold prediction accuracy.

17. A non-transitory computer-readable medium storing code for communication data processing at a database server, the code comprising instructions executable by a processor to:
receive, at the database server, a copy of a communication message received by an application running on a first user device for a first user;
classify the communication message with one or more binary classifications based at least in part on a natural language processing (NLP) analysis of text of the communication message;
select, from a stored list of possible services on the database server, a set of services that correspond to a set of actions that are in response to receiving the copy of the communication message and that are based at least in part on the one or more binary classifications;
send indication instructions indicating the selected set of services to the application running on the first user device, the indication instructions instructing the application to automatically generate a communication template from the first user that is responsive to the communication message and that incorporates information based at least in part on the classified one or more binary classifications, wherein the communication template corresponds to at least one action of the set of actions;
receive user feedback based at least in part on user input from the first user to the application running on the first user device, the user input triggering the application running on the first user device to perform an action of the set of actions; and
send additional indication instructions indicating a subset of the selected set of services to the application running on a second user device for the first user, the subset of the selected set of services corresponding to a subset of the set of actions comprising each action of the set of actions except for the performed action based at least in part on the user input triggering the application running on the first user device to perform the action.

18. The non-transitory computer-readable medium of claim 17, wherein the instructions are further executable by the processor to:
extract metadata from the communication message, wherein selecting the set of services that correspond to the set of actions is further based at least in part on the extracted metadata.

19. The non-transitory computer-readable medium of claim 17, wherein the instructions are further executable by the processor to:
modify a service selection process specific to the first user based at least in part on the received user feedback.

* * * * *